United States Patent [19]

Gudea

[11] 4,051,913
[45] Oct. 4, 1977

[54] ELECTRONIC POSTAGE SCALE

[75] Inventor: Dumitru Gudea, Chicago, Ill.

[73] Assignee: Triner Scale and Manufacturing Company, Chicago, Ill.

[21] Appl. No.: 652,820

[22] Filed: Jan. 27, 1976

[51] Int. Cl.$^2$ .......................................... G01G 19/413
[52] U.S. Cl. ...................................... 177/25; 177/50; 235/92 WT; 364/466; 364/467
[58] Field of Search ............................. 177/25, 50, 1; 235/151.33, 92 WT, 92 EV; 340/172.5

[56] References Cited

U.S. PATENT DOCUMENTS

| | | | |
|---|---|---|---|
| 3,039,686 | 6/1962 | Bell | 235/151.33 |
| 3,635,297 | 1/1972 | Salava | 177/25 X |
| 3,951,221 | 4/1976 | Rock | 177/25 X |

*Primary Examiner*—Joseph W. Hartary
*Attorney, Agent, or Firm*—Pasquale A. Razzano; William S. Frommer

[57] ABSTRACT

A method of and apparatus for determining and displaying the postal rate for a parcel to be shipped to a destination zone by a selected class of shipment in accordance with the weight of the parcel. A memory is provided with plural sections, each section being substantially associated with a particular class of shipment, and each section storing postal rate data for predetermined weight increments at addressable locations. The address of a location is determined by the parcel weight and the destination zone. Digital weight data is produced as a function of the weight of a parcel placed on the scale and the particular class of shipment and destination zone are selected as desired. The addressed memory location preferably is comprised of first and second parts for storing first and second portions of the composite postal rate data; these first and second parts being read out on a time sharing basis to a display device. The reading out and displaying of postal rate data is inhibited upon the occurrence of one or more of predetermined conditions, including the absence of a parcel on the scale, the removal of a parcel from the scale, the improper selection of a destination zone, the improper selection of a class of shipment or the addressing of an improper memory storage location.

Also disclosed are various aspects of the inhibiting feature which is used in this postage scale and particular aspects of the time sharing memory read-out and display.

19 Claims, 5 Drawing Figures

ELECTRONIC POSTAGE SCALE

BACKGROUND OF THE INVENTION

This invention relates to an electronic postage scale and, more particularly, to such a scale wherein postal rate data is stored in various sections of a memory, each section being substantially associated with a class of shipment for a parcel to a destination zone, and each memory section being constituted by plural addressable storage locations whereat the postal rate data is stored and which are addressable as a function of the weight of a parcel and the particular destination zone thereof. The present invention is further concerned with various control features incorporated into such a postage scale whereby the possibility of displaying an improper or erroneous postal rate is significantly minimized. The present invention is additionally concerned with an electronic postage scale of relatively simple construction, reduced cost and which takes full advantage of digital circuitry which is available in integrated circuit form.

Generally, in computing the requisite postage for a parcel to be mailed to a desired destination, such postage is not only dependent on the weight of the parcel but, in addition, depends upon the particular destination zone and the class of shipment that is desired. Typically, the classes of shipment which are available are individually associated with a unique postage rate. As an example, such classes of shipment are priority, UPS intrastate and interstate, parcel post, book rate and blue label.

Prior to the advent of automatic postage calculating devices, an individual would determine the proper postage by firt weighing the parcel to be shipped and, once the weight of that parcel has been determined, a reference table associated with the selected class of shipment was consulted and the indicated postage for the desired destination zone was recorded. A comparison of postage rates for each class of shipment required that the individual refer to each reference table and record the corresponding postage obtained therefrom. It was fully appreciated that this technique of computing postage was not only time consuming but was subject to various errors that inadvertently could occur during the normal usage of such reference tables.

Accordingly, the introduction of automatic postage scales and calculating devices evidently met a definite need. One such prior art automatic postage scale is disclosed in U.S. Pat. No. 3,738,438. This postage scale uses digital techniques to automatically provide an indication of the postage required for a selected class of shipment to a desired destination zone in accordance with the weight of the parcel to be shipped. The postage data for each class of shipment and destination zone are provided as coded perforations in an adjustable postage code roll. That is, the postage codes are arranged on the roll in a plurality of groups, each group representing the postage rates for a particular combination of distance zone and class of shipment. An operator advances the roll to select the proper rate group. When the proper rate group is selected, it consists of a plurality of sets of further codes representing the postage for various parcel weights in the selected rate group. The particular data set is detected in accordance with the weight of the parcel and the postage represented by that data set is read out and displayed.

The use of such as encoded postage data roll requires that an operator, or auxiliary automatic apparatus, advance the roll until the proper rate group representing a predetermined class of shipment and a desired destination zone is obtained. This, of course, requires careful supervision by the operator and further requires the use of a bulky data roll that occupies space which could otherwise be advantageously used. Hence, the total time required to determine the requisite postage for a parcel, although significantly reduced from previous mechanical postage scales which relied upon the operator consultation of rate charts, can be still further reduced.

Another example of a prior art electronic postage scale is described in U.S. Pat. No. 3,692,988. In this sytem, a digital representation of parcel weight is produced and an optical drum is used to store postal rate data. Addressable portions of this optical drum are selected as a function of the parcel weight and a selected destination. Once addressed, the data stored at this location in the optical drum is read out and can be used for display or for automatically operating a suitable postage meter device.

Yet another prior art postage scale is described in U.S. Pat. No. 3,535,297. In this postage scale, suitable selector switches are provided to enable an operator to select a particular class of shipment and to key in the ZIP code information of the parcel destination, corresponding to the destination zone. A read only memory is divided into sections which may correspond, generally, with the available classes of shipment. In a memory section, postal rates are stored at individually addressable locations, the postal rate at each such location being a function of the parcel weight and the destination zone.

The prior art postage scales which have been briefly described hereinabove by way of example, suffer from the common disadvantage in that they are not provided with satisfactory or sufficient control apparatus. That is, these scales will provide a postal weight display for many instances wherein insufficient information has been provided to permit a proper rate to be determined. For example, while some prior art postage scales advantageously display a changing postal rate caused by the movement of the scale platform when a parcel initially is placed thereon or is removed therefrom, many of these scales will provide an unintelligible display for the case wherein the scale platform returns and then passes through its initial reference position. This display, which can be though of as a "negative weight" display, is best prevented so as to avoid possible confusion of an operator or attendant of the postage scale. Also, some prior art postage scales will provide a postal rate display once a suitable class of shipment and destination zone for the parcel have been determined, even though the parcel has not yet been weighed. This display for "zero weight" often can be confusing; and it is best to prevent a postal rate display until a finite parcel weight has been detected. In still other prior art postage scales, a postal rate will be displayed even though all of the information necessary for determining such a postal rate has not yet been entered into the scale. For example, if the class of shipment or destination zone of the parcel has not been entered, some of these scales nevertheless will provide a postal rate indication. Since this indication is, essentially, meaningless, it is best to prevent such a display until all of the requisite data has been entered.

Another disadvantage attending such prior art postage scales is that they do not adequately exploit the availability of relatively inexpensive integrated circuit components. For example, for those scales which utilize an electronic or magnetic memory device for storing postal rate information, such memories generally are of the type which store an entire digital word representing the complete weight information at each addressable location. Since the postal rate usually is in terms of dollars and cents, each of which may be a two-digit decimal number, such a digital word may be, for example, a 16-bit word. Memories which must store 16-bit words generally are quite expensive. This expense can be significantly reduced if the size of the digital word is decreased, and if time-sharing, or multiplexing, techniques are used to read postal rate data out of the memory. For example, a substantial savings can be realized if the memory device need only store 8-bit digital words, and if each addressed location encompasses two of such words which are read out in time-sharing format.

OBJECTS OF THE INVENTION

Therefore, it is an object of the present invention to provide an improved electronic postage scale which does not suffer from the aforenoted disadvantages which are found in prior art postage scales.

Another object of this invention is to provide an electronic postage scale having a postal rate display, wherein the display is inhibited upon the occurrence of one or more predetermined conditions.

Yet another object of this invention is to provide an electronic postage scale having a postal rate display which is inhibited until all the necessary information for determining the correct postal rate has been provided.

A further object of this invention is to provide an improved postage scale having a postal rate display which is inhibited until a parcel is placed upon the scale.

An additional object of this invention is to provide an improved postage scale having a postal rate display which is inhibited after a parcel has been removed from the scale.

A still further object of this invention is to provide an improved postage scale having a memory whereat postal rate data is stored at addressable locations and wherein such postal rate data is read out and displayed once a parcel has been placed on the scale and the necessary shipping information has been provided, a postal rate display being inhibited for those instances when the memory is improperly addressed.

Another object of this invention is to provide an improved electronic postage scale of simple construction and low cost wherein solid-state integrated circuitry is used throughout.

Still another object of this invention is to provide an electronic postage scale having a memory for storing postal rate information, wherein such memory can be utilized in a time-sharing, or multiplexing, format, thereby permitting the memory to be of low cost.

A further object of this invention is to provide data processing techniques and features having particular utility in an electronic postage scale, and which find general application in the data processing field.

Various other objects, advantages and features will become apparent from the ensuing detailed discussion, and the novel features will be particularly pointed out in the appended claims.

SUMMARY OF THE INVENTION

In accordance with this invention, a method of and apparatus for determining and displaying the postal rate for a parcel to be shipped to a destination zone by any one of a plurality of classes of shipment are provided, wherein a memory includes plural sections, each of which being substantially associated with a particular class of shipment and each being capable of storing postal rate data for predetermined parcel weight increments at addressable locations, the address of a location being determined by the parcel weight and the destination zone; each addressed memory location being comprised of first and second parts for storing first and second portions, respectively, of the composite postal rate data, these respective portions being read out on a time-sharing, or multiplexing, basis to a display device; such reading out and displaying of postal rate data being inhibited upon the occurrence of one or more predetermined conditions, including the absence of a parcel on the scale, the removal of a parcel from the scale, the improper selection of a destination zone, the improper selection of a class of shipment or the improper addressing of a memory storage location.

BRIEF DESCRIPTION OF THE DRAWINGS

The following detailed description, given by way of example, will best be understood in conjunction with the accompanying drawings in which.

DETAILED DESCRIPTION OF A CERTAIN ONE OF THE PREFERRED EMBODIMENTS

The Overall System

Figure 1:
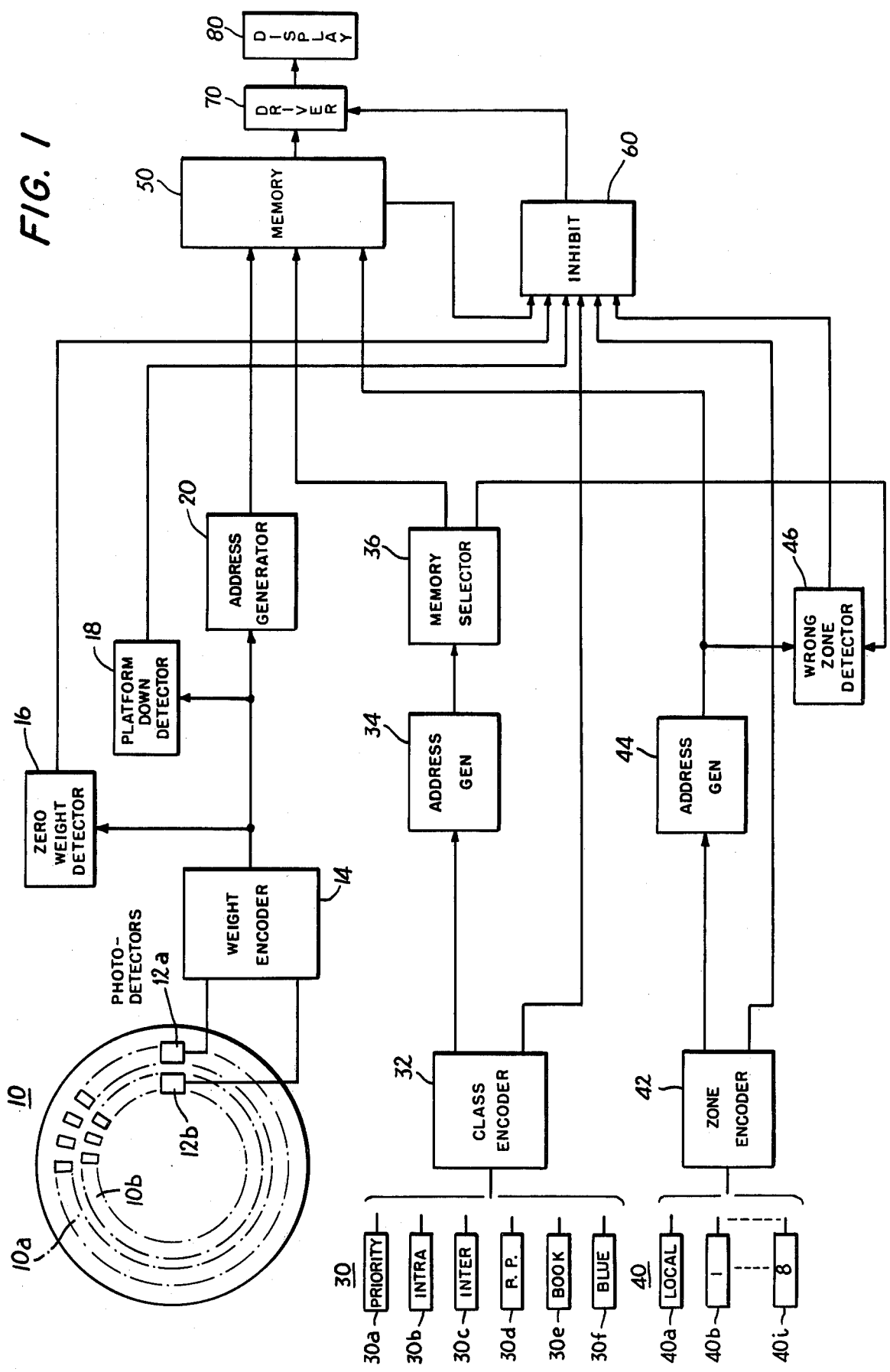
FIG. 1 is a block diagram of an electronic postage scale in accordance with the teachings of this invention.

Referring now to the drawings, and in particular to FIG. 1, there is illustrated a block diagram of the electronic postage scale in accordance with the present invention. The scale includes a platform (not shown) upon which a parcel is placed, and which is adapted to be displaced as a function of the parcel weight. Suitable mechanical coupling (also not shown) serves to drive an encoding transducer 10 directly as the scale platform is displaced. Hence, the encoding transducer 10 is correspondingly displaced as a function of the parcel weight. In the preferred embodiment illustrated herein, the encoding transducer 10 preferably is a rotatable disc formed with two parallel circular, coaxial tracks 10a and 10b, each track bearing coded indicia thereon. The coded indicia are directly proportional to predetermined weight increments of the parcel such that a number of indicia are rotated past a reference point in correspondence with the weight of the parcel. The indicia may be detected by conventional techniques, such as optical, magnetic, mechanical, or electro-mechanical, as examples; and in the preferred embodiment are capable of optical detection. Hence, the track 10a is formed of alternating light and dark patterns, each being of equal width. Similarly, the track 10b is comprised of alternating light and dark patterns, these alternating patterns also being of equal width and being displaced with respect to the patterns of the track 10a. The respective tracks of light and dark patterns are seen to be periodic such that a cycle commences from the leading edge of a dark pattern. With respect to this cycle, the periodic patterns in the track 10b are displaced by 90° from the periodic patterns in the track 10a. If the disc 10 is considered to rotate in the counterclockwise direction when a parcel is placed upon the scale platform, then it is appreciated that the patterns in the track 10a are in leading relation with respect to the patterns in the track 10b. This phase-shifted relationship between the respective pattern tracks is used to detect the direction of rotation of the disc 10, and, consequently, to determine whether a parcel is placed upon or removed from the scale platform. In an alternative embodiment, a single track cooperates with two optical detectors which serve to detect the direction of rotation of the disc.

In the illustrated embodiment, a pair of photodetectors 12a and 12b, disposed at a reference point, are in optical detecting relation with respect to the tracks 10a and 10b, respectively. These photodetectors may be conventional and are adapted to detect the presence of the light and dark patterns as such patterns are displaced past the fixed photodetector site. Thus, it is recognized that the respective photodetectors are capable of producing pulses which correspond to the light and dark patterns in the respective tracks 10a and 10b. A weight encoder 14 is coupled to these photodetectors 12a and 12b and is adapted to produce a digital representation of the parcel weight in response to the pulses which are supplied thereto by the photodetectors. For example, if the width of each dark pattern (and thus each light pattern) represents a weight increment of one-half ounce, then the weight encoder 14 serves to count the number of such one-half ounce increments which are produced and to generate a digital signal representing the total number of one-half ounce pulses which have been produced by the photodetectors. This, of course corresponds to the effective weight of the parcel. Alternatively, the width of each dark pattern (and thus each light pattern) may correspond to a weight increment of 0.05 pounds. In that event, the weight encoder 14 serves to generate a digital signal representing the total number of 0.05 pound pulses which are produced by the photodetectors.

The weight encoder 14 is coupled to a zero weight detector 16 and to a platform down detector 18. The zero weight detector 16 is adapted to detect when the scale platform, and thus the disc 10, has not been displaced from its initial, reference position; which means that a parcel has not been placed thereon. It is appreciated that when the disc 10 admits of its initial position, the digital signal produced by the weight encoder 14 represents a parcel weight of zero. This particular digital signal is detected by the zero weight detector 16 and a suitable inhibit output signal is produced thereby. This inhibit output signal is applied to an inhibit circuit 60, as shown in FIG. 1.

It may be appreciated that the scale platform is sufficiently sensitive to small parcel weights so as to be correspondingly displaced when a light weight parcel is placed thereon. This sensitivity means that the mechanical damping characteristic of the platform is subject to constraints. Hence, when a parcel is removed from the platform, it is expected that the platform will return to its initial, or zero weight positions, and then, because of its inertia, will overshoot this position to some degree. This overshoot of the zero weight position can be considered to be the response of the scale partform to a parcel of "negative" weight. The platform down detector 18 is adapted to sense when the digital signal produced by the weight encoder 14 is representative of such "negative" weight. Hence, when a parcel has been removed from the platform, and when the platform no longer is depressed, or in its "down" state, the platform down detector 18 will produce a corresponding inhibit output signal. This platform down detector inhibit output signal is applied to the inhibit circuit 60, as illustrated.

The weight encoder 14 additionally is coupled to an address generator 20. The address generator is adapted to convert the digital signal produced by the weight encoder 14 into a suitable format which is compatible with a memory 50, whereby stored postal rate information associated with the parcel weight as represented by the output of the weight encoder 14 is read out from the memory. The structure and operation of the memory 50 will be described in greater detail hereinbelow. Suffice it to say that the memory is adapted to store postal rate information for each weight increment of a parcel, for each destination zone to which the parcel can be shipped, and for each class of shipment which is available to that parcel. As an example, if there are six classes of shipment which are available and if there are nine destination zones to which a parcel can be shipped, theoretically, there is a maximum of 54 different postal rates for each weight increment. Of course, this theoretical maximum is not fully utilized because, as will be described hereinbelow, there are many classes of shipment for which only a selected one or ones of the nine destination zones are used. For example, while the class of priority mail provides for eight different destination zones to which a parcel can be shipped, the class of shipment known as "book rate" provides for only a single zone, regardless of the actual destination of the parcel. In any event, the address generator 20 serves to produce a portion of the address of a memory location whereat the postal rate data associated with the determined parcel weight is stored. It should be fully appreciated that, if the digital signal produced by the weight encoder 14 is compatible with the memory address parameters, the address generator 20 may be omitted and the digital signal produced by the weight encoder may be used directly as a portion of the memory location address.

As noted hereinabove, the parcel may be shipped to a desired destination zone in accordance with a selected class of shipment. For the purpose of describing the postage scale disclosed herein, such classes of shipment include priority mail, United Parcel Service (UPS) and Parcel Post (PP). In addition, depending upon the nature of the parcel, it may be sent so as to take advantage of book rates or blue label service. To accommodate these classes of shipment, and to permit the suitable selection of a desired class, a set of class selecting switches 30 is provided. These switches include the priority selecting switch 30a, UPS intrastate selecting switch 30b, UPS interstate selecting switch 30c, parcel post selecting switch 30d, book rate selecting switch 30e and blue label selecting switch 330f. Although not necessary to the understanding of the present invention, it is appreciated that additional classes of shipment may be provided or, alternatively, a smaller number of such classes may be made available. The switches 30a - 30f may be conventional push-button switches and, if desired, may be mechanically or electrically interconnected so that only a single switch may be actuated at any time. Also, suitable indicating lamps may be provided to provide an indication of the actuated selector switch. If desired, these indicating lamps may be incorporated into the selector switches as an integral unit, and such integral lighted push-button selector switches are commercially available.

A class encoder 32 is coupled to all of the class selector switches 30 and is adapted to produce an encoded digital signal representing the particular class selector switch which has been actuated. Hence, the class encoder 32 may be comprised of discrete logic gating circuitry or may be a commercially available encoding circuit. In any event, the class encoder is energized when the first of the class selector switches 30 is actuated, thereby to produce the encoded digital signal and to apply same to an address generator 34. However, in the event that none of the class selector switches has been actuated, the class encoder 32 is not energized and an inhibit signal indicative of the non-energization of the class encoder is produced and supplied to the inhibit circuit 60.

The address generator 34 is adapted to convert the encoded digital signal produced by the class encoder 32 to a suitable address signal and to supply same to a memory selector circuit 36. It should be appreciated that, if the encoded digital signal produced by the class encoder is compatible with the input requirements of the memory selector circuit 36, the address generator 34 may be omitted.

As briefy described hereinabove, the memory 50 is adapted to store postal rate data for each parcel weight increment, for each destination zone and for each class of shipment for the parcel. In a preferred embodiment, the memory 50 is divided into sectors, each sector being substantially associated with an available class of shipment. For example, one sector included in the memory 50 is associated with priority mail. Another sector in the memory is associated with parcel post. Still another sector in the memory is associated with UPS. Hence, it is seen that, to facilitate access of the memory and to simplify the memory addressing circuit, it is preferable to access, or enable, only a single sector of the memory depending upon the particular class of shipment which has been selected. This is the purpose of the memory selector circuit 36. Thus, when a particular class selector switch has been actuated, the memory selector circuit 36 accesses the corresponding sector in the memory to permit the appropriate postal rate data stored in that sector and determined by the parcel weight to be read out therefrom.

One having ordinary familiarty with the shipment of parcels will appreciate that the postal rate is determined by the distance over which the parcel must be shipped. Such parcel shipping distances are allocated into selected zones. As an example, the United States is divided into eight separate zones, these zones being associated with regional mail distribution centers. Thus, a parcel may be shipped from one of these zones, i.e., the zone of origination, to any of the other zones, i.e., the destination zone. In addition, a parcel may be shipped from one part of the origination zone to another part of the same zone. In that event, the parcel is shipped within a "local" zone. Hence, to determine the proper postage rate for shipping a parcel, it is necessary to select the destination zone of that parcel. To this effect, a set of zone selector switches 40 is provided, these switches including a local zone selector switch 40a, a zone 1 selector switch 40b, . . . and a zone 8 selector switch 40i. All of these zone selector switches 40 are connected to a zone encoder 42 which may be similar to the aforenoted class encoder 32. Hence, the purpose of the zone encoder is to produce a digitally encoded representation of the particular zone selector switch which has been actuated. Similar to the class encoder, if one of the zone selector switches is actuated, the zone encoder 42 remains in its non-energized condition to thereby supply a corresponding inhibit signal to the inhibit circuit 60.

The digitally encoded zone representation, produced by the zone encoder 42, is applied to an address generator 44. This address generator may be similar to the aforedescribed address generator 34 or, if desired, to the address generator 20. Its purpose is to produce a portion of a memory location address signal and to apply this signal to the memory 50 whereat it cooperates with the address signal produced by the weight address generator 20 to access a particular location in a selected memory sector. This enables the postal rate information stored at the addressed location in the selected memory sector to be read out. Since the address generator 44 may be similar to the address generator 20, it too can be omitted, if the zone encoder digital output signal is compatible with the memory address parameters.

The output of the zone address generator 44 also is applied to a wrong zone detector 46. Another input to this wrong zone detector is supplied by the memory selector circuit 36. The wrong zone detector 46 is adapted to sense when an improper zone selector switch 40 has been actuated. As an example, it is known that if the UPS intrastate class of shipment is selected, only particular destination zones are available. However, if an improper zone selector switch is actuated when the UPS intrastate switch 30b is actuated, the wrong zone detector 46 will produce an inhibit output signal representing such an improperly selected zone. Similarly, if the UPS blue label class of shipment is selected, only certain ones of the zone selector switches 40 can be properly actuated. If an improper zone selector switch is actuated, the wrong zone detector 46 produces a suitable inhibit output signal representing such improperly actuated zone selector switch. Accordingly, the wrong zone detector 46 may be comprised of a comparator circuit which is energized by the memory selector circuit 36 when predetermined ones of the class selector switches 30 have been actuated. Once energized, the wrong zone detector 46 will compare the selected zone, as represented by the address signal produced by the address generator 44, to preset zones associated with the predetermined classes. Should the selected zone be outside the range of the present zones, a corresponding inhibit output signal is produced by the wrong zone detector. This inhibit output signal is supplied to the inhibit circuit 60.

As noted hereinabove, the memory 50 preferably is comprised of a plurality of sectors, each of which is substantially associated with a corresponding class of shipment. The reason for this division of the memory now will be explained.

It is known that postal rates are constantly revised. Such revisions, in general, do not conform to a predetermined pattern. For example, the postal rates for some classes may be increased by a greater amount than for other classes. Also, the postal rate for shipment between some zones may be increased by a greater amount than postal rates for shipment between other zones. Furthermore, the rates for parcels weighing more than a particular amount may be greater than for parcel weights which are less than that amount. Therefore, to accommodate all of these diverse postal rate changes, and to anticipate future changes in the postal rates, it is preferred that the memory 50 be divided into individually replaceable sectors. As an example, the memory 50 preferably is a read only memory (ROM) formed of semiconductor devices, such as MOS or C-MOS devices. These semiconductor sectors preferably are disposed on replaceable circuit boards, such as printed circuit cards, to permit easy removal and replacement of those sectors which require postal rate revisions. In one embidment thereof, the ROM is a programmable ROM, whereby the postal rate data stored therein can be reprogrammed when necessary as the postal rates are revised. Such replaceable programmable ROM sectors are commercially available; the contents of such programmable ROM devices being changed in resonse to irradiation by, for example, ultaviolet light.

Although, in general, the sectors of the memory 50 are associated with corresponding classes of shipment, some of these classes will have relatively low memory capacity requirements. For example, book rate is provided with only a single destination zone. Hence, the postal rate data which must be stored for book rate is, essentially, limited only to the postal rate for each weight increment. This relatively small amount of stored postal rate data can be provided in another sector in the memory 50; and a totally independent sector need not be dedicated solely to this book rate class of shipment. Nevertheless, even with this attempt to consolidate the requisite number of memory sectors and thus reduce the amount of addressable memory locations which must be dedicated, it is appreciated that there still will be some memory locations which are not necessary for the storage of postal rate data. These addressable locations are not used during a normal postal rate determining operation. However, in the event that there is an inadvertent error in the operation of the postage scale, or if there is a malfunction therein, whereby such unused locations are addressed, it is preferred that the contents of such locations are not displayed and, in addition, an optional indication of such error or malfunction be provided. To this effect, these unused locations in the memory 50 are provided with predetermined signals therein which are detected when such locations are addressed. An indication of the addressing of such an improper storage location in the memory 50 is supplied as an inhibit signal to the inhibit circuit 60, as diagrammatically illustrated.

As shown, the output of the memory 50 is coupled to a display 80 by a suitable display driver 70. In a preferred embodiment of this invention, the display 80 comprises a conventional viewable, or optical, display of the type wherein the postal rate for the weighed parcel is indicated in the form of dollars and cents. Such display may comprise a photodiode array, a light emitting array, a conventional seven-segment array, or the like. Depending upon the particular construction of the display 80, the display driver 70 is appreciated as being compatible therewith and is adapted to convert the data which is read out from the memory 50 to a form suitable for actuating the display. In the event that the display 80 is comprised of a seven-segment array, the display driver 70 is a conventional code converter and seven-segment driver. That is, if the data stored in the memory 50 is in binary form, the driver 70 serves to convert this binary form to another form compatible with the requirements of the display. Alternatively, if the memory 50 stores data in a particular coded format, the driver 70 serves to convert this coded format to a form compatible with the display. In addition, the driver 70 is seen to include an inhibit (or enable) input terminal which is coupled to the inhibit circuit 60 and is adapted to receive a suitable signal produced by the inhibit circuit. Thus, depending upon whether an inhibit signal has been received from any of the circuits connected to the inhibit circuit 60, a corresponding inhibit signal will be applied to the driver 70 to inhibit the operation of the driver. Alternatively, the inhibit circuit 60 may be adapted to supply an enable signal to the driver 70 in the event that none of the circuits which are connected to the inhibit circuit are conditioned to supply an inhibit signal thereto. This interconnection between the inhibit circuit and the display driver serves to prevent an erroneous or unintelligible display upon the occurrence of predetermined conditions.

In addition to, or in substitution for, the display and display driver, the output of the memory 50 may be coupled to a postal rate imprinting device, to a billing and inventory computer, and the like. These additional devices permit the automatic determination and application of the correct postage for a parcel to be shipped and, moreover, may facilitate accounting and billing procedures.

The operation of the overall system block diagram depicted in FIG. 1 now will be described. Initially, a parcel is placed upon the weighing platform of the postage scale and selected ones of the class switches 30 and zone switches 40 are actuated. The sequence in which the switches are actuated is not essential to the proper operation of the illustrated apparatus. Hence, a class selector switch can be actuated prior to the actuation of a zone selector switch, or the class and zone selector switches can be actuated simultaneously, or the zone selector switch can be actuated first. Also, it is not critical whether the parcel first is placed upon the weighing platform and then the suitable switches are actuated, or whether the switches are first actuated and then the parcel is placed on the postage scale. In any event, once a class selector switch 30 has been actuated, an encoded representation of the particular switch is produced by the class encoder 32; and this encoded representation is converted to a suitable address by the address generator 34. In response to this address, the memory selector 36 selects a corresponding sector in the memory 50.

Once a zone selector switch 40 has been actuated, the zone encoder 42 produces an encoded representation of the particular zone selector switch which has been actuated and the address generator 44 produces a portion of a memory location address in response to this encoded representation. If the selected class of shipment is of the type which permits only a limited number of destination zones, the output of the zone address generator 44 (which represents the selected zone) is compared in the wrong zone detector 46 to preset zones associated with that class of shipment. If the selected zone is compatible with the class of shipment, the wrong zone detector 46 does not apply an inhibit signal to the inhibit circuit 60. However, if the selected zone is not compatible with the selected class of shipment; for example, if the class blue label has been selected and the zone 8 switch 40$i$ has been inadvertently actuated, an inhibit signal will be produced by the wrong zone detector 46, this inhibit signal being applied to the inhibit circuit 60 to effectively inhibit a display of postal data.

When the parcel is placed upon the weighing platform, the encoding disc 10 will be correspondingly angularly displaced in a direction representing an increase in weight. For example, the disc 10 may be rotated in the counterclockwise direction, and as the alternating light and dark patterns in the tracks 10a and 10b pass the photodetectors 12a and 12b, corresponding pulses will be produced thereby. These pulses, indicative of a weight incrementing operation, are received by the weight encoder 14, which produces an encoded representation of the parcel weight. As an example, the weight encoder may include a pulse counting device whose count is incremented at each light-dark pattern transition. Hence, as the weighing platform is depressed, the encoded representation of the parcel weight is dynamically changed. This change in the encoded weight representation effects a corresponding change in the address produced by the address generator 20, which is applied to the memory 50. If, at this time, a memory sector has been selected, as by the actuation of a suitable class selector switch 30, and if the zone data portion of a memory location address has been produced in response to the actuation of a zone selector switch 40, the dynamic change in the output of the address generator 20 will cause succeeding memory locations to be addressed and the contents in such addressed locations to be read out through the display driver 70 to the display 80. Thus, the displayed postal rate is continually incremented in response to the placing of a parcel on the weighing platform.

It is expected that, because of the mechanical structure of the postage scale (which forms no part of the present invention), the encoding disc 10 will rotate beyond its final point of displacement and then will return to that point. Thus, as the disc 10 subsequently rotates in the clockwise direction, the light-dark transitions in the patterns on the tracks 10a and 10b will be sensed by the photodetectors 12a and 12b to correspondingly change the encoded weight representation produced by the weight encoder 14. It is appreciated that this change in the encoded weight representation effects a corresponding change in the weight portion of the memory location address produced by the address generator 20. This, of course, means that the addressed location in the memory 50 correspondingly changes, with the concomitant change in the displayed postal rate. Once the encoding disc 10 has reached its steady position, the correct postal rate associated with the weight of that parcel which is to be shipped by the selected class of shipment to the selected destination zone will be read out from the memory and displayed by the display 80.

Once the correct postal rate has been displayed, the parcel can be removed from the weight platform. The removal of the parcel is accompanied by the return of the weighing platform to its initial, reference position, and the encoding disc 10 now rotates in the opposite direction, that is, the clockwise direction. This rotation of the encoding disc effects a corresponding change, or decrement, in the encoded weight representation produced by the weight encoder 14 and a corresponding change in the weight portion of the address produced by the address generator 20. Thus, as the disc 10 rotates, different locations in the memory 50 are addressed and the postal rate stored at these different locations are displayed. Once the weighing platform has reached its reference position, the patterns which are sensed by the photodetectors 12a and 12b will correspond to zero weight. A suitable encoded representation of such zero weight is produced by the weight encoder 14 and is sensed by the zero weight detector 16. The zero weight detector thus applies an inhibit signal to the inhibit circuit 60 which, in turn, prevents the driver 70 from actuating the display 80 with whatever data then is being read out of the memory 50.

It is recognized that, because of its mechanical construction, the weighing platform and encoder disc 10 will not be arrested instantaneously at the reference position. Rather, the encoding disc 10 will continue to be slightly displaced in the clockwise direction. This may be considered to correspond to a "negative" weight, and a suitable encoded representation of this negative weight is produced by the weight encoder 14 and sensed by the platform down detector 18. For example, if the weight encoder 14 is capable of producing encoded representations between zero and one hundred pounds, such encoded representations will be changed from zero pounds to one hundred pounds once the encoding disc rotates beyond its reference position. The platform down detector 18 thus may be capable of sensing an encoded representation of one hundred pounds which, in this example, means that the weighing platform is not depressed, that is, it is not "down." This detection that the platform is not down is applied to the inhibit circuit 60, whereby the driver 70 is prevented from driving the display 80. Of course, once the encoding disc 10 has returned to its reference position, the output of the platform down detector 18 terminates. When the weighing platform and encoding disc 10 have returned to their reference positions, the postage scale is prepared for a subsequent postal rate determining operation.

It is appreciated that if a parcel is placed upon the weighing platform but, through inadvertence, a class selector switch 30 or a zone selector switch 40 has not been actuated, the respective class and zone encoders 32 and 42 will supply suitable inhibit signals to the inhibit circuit 60. Such inhibit signals serve to cause the inhibit circuit to prevent the driver 60 from driving the display 80. Hence, confusing or unintelligible displays are prevented.

Although not shown in FIG. 1, it is appreciated that the display 80 or an additional display can be provided for displaying the actual weight of the parcel which is placed upon the postage scale. To this effect, an additional display can be coupled to the output of the weight encoder 14. Alternatively the output of the weight encoder can be supplied, through suitable switching devices, to the driver 70 and thus to the display 80. Such weight display also can be provided with tare circuitry whereby only the actual, or net, weight of the parcel is displayed.

THE WEIGHT ENCODER

Figure 2A:
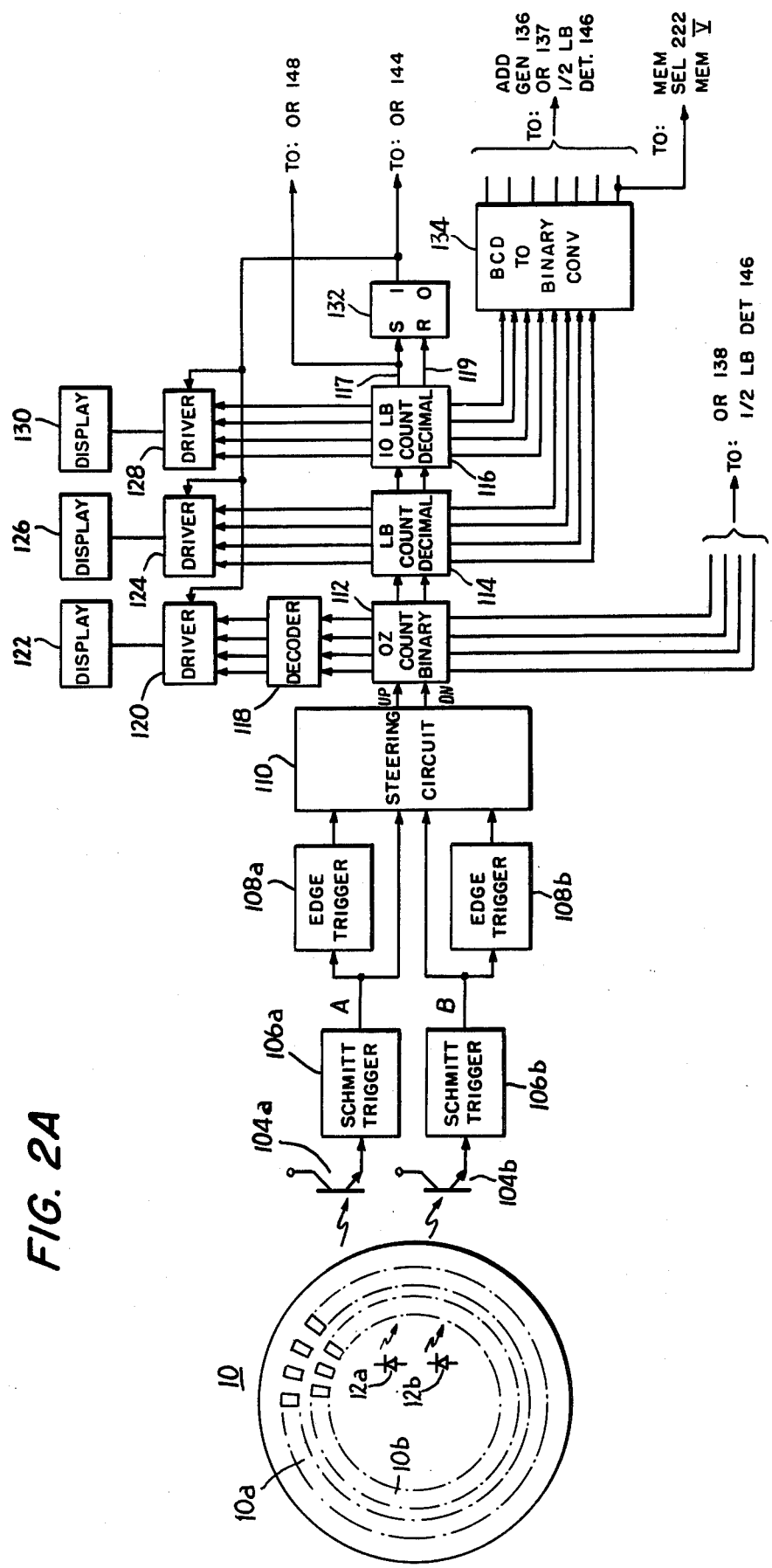
FIGS. 2A-2D are logic diagrams which, in combination, show the electronic postage scale of this invention in greater detail.

Referring now to FIG. 2A, there is illustrated a logic circuit which comprises one embodiment of the weight encoder 14. This logic circuit is comprised of Schmitt triggers 106a and 106b, edge triggers 108a and 108b, steering circuit 110, counter circuits 112, 114 and 116 and code converter 134. The Schmitt triggers 106a and 106b are adapted to receive pulses which are produced in response to the light and dark patterns in the tracks 10a and 10b of the encoding disc 10. The pulses which are supplied to the Schmitt triggers are produced by photodetectors which, in the illustrated embodiment, are comprised of phototransistors 104a and 104b aligned with the respective tracks 10a and 10b. The phototransistors 104a and 104b are in light communication with light emitting diodes 102a and 102b, respectively. Other suitable light emitting devices can be used in place of the diodes, if desired. The light communicated from the light sources to the phototransistors is interrupted by the dark patterns upon the encoding disc to thereby result in the corresponding pulses which are applied to the Schmitt triggers by the phototransistors. The light sources and phototransistors can be disposed on opposite sides of the encoding disc such that light is transmitted directly through the light patterns on the encoding disc and is interrupted by the dark patterns. Alternatively, the light sources and phototransistors can be disposed on the same side of the encoding disc and a light reflection path defined by the disc can be formed therebetween.

The Schmitt triggers 106a and 106b are conventional and are adapted to produce output pulses when the phototransistor outputs exceed a predetermined threshold, or triggering, level. It is appreciated that, in this embodiment, the Schmitt triggers are used as wave-shaping circuits to produce suitable pulses in response to the phototransistor outputs which are detetermined by the detected light and dark patterns on the encoding disc 10. The outputs from the Schmitt triggers 106a and 106b are designated A and B, respectively, and are applied to a steering circuit 110. In addition, the pulse outputs produced by the Schmitt triggers are applied to edge trigger circuits 108a and 108b, respectively. The edge trigger circuits are conventional and each is adapted to produce an output pulse in response to a transition in the output supplied thereto by its associated Schmitt trigger. Thus, for example, if the Schmitt trigger is adapted to produce a positive transition upon sensing a light-dark pattern transition, the edge trigger circuit will produce an output pulse at that transition time. Since the patterns in the track 10a are displaced, or skewed, with respect to the patterns in the track 10b, it is appreciated that the pulses produced by the respective Schmitt triggers and the edge pulses produced by the edge trigger circuits will be produced in relative time displacement with respect to each other. The nature of this time displacement, that is, a leading or lagging relationship between the various edge pulses and Schmitt trigger pulses is indicative of the direction of rotation of the encoding disc 10 and, consequently, an indication of whether a parcel is placed on or removed from the weighing platform. As noted hereinabove, this indication also can be provided by a single track which cooperates with two phototransistors in conventional manner.

The Schmitt triggers 106a and 106b and the edge triggers 108a and 108b all are connected to the steering circuit 110. The steering circuit is comprised of conventional gating circuits and is adapted to supply pulses to a first output terminal thereof when the encoding disc 10 is rotated in the counterclockwise direction and to apply pulses to a second output thereof when the encoding disc is rotated in a clockwise direction. These pulses can be the Schmitt trigger output pulses produced by the Schmitt trigger 106a or the Schmitt trigger 106b or, alternatively, may be the edge pulses produced by the edge trigger 108a or the edge trigger 108b. In any event, each of the pulses applied to an output of the steering circuit represents a predetermined weight increment. For example, if the light and dark patterns on the encoding disc 10 are spaced such that a light-dark or dark-light transition occurs for each ½ ounce increment, the number of pulses which are produced at one or the other of the steering circuit outputs is equal to the number of transitions which have been sensed by the phototransistors which, in turn, is proportional to the weight of the parcel. For the purpose of this discussion, one output of the steering circuit 110 is designated the UP output and the other output is designated the DN output. Thus, when the disc 10 rotates in the counterclockwise direction, a pulse is produced at the UP output of the steering circuit corresponding to each ½ ounce increment in the parcel weight when the weighing platform is depressed and a pulse is produced at the DN output for each ½ ounce of parcel weight when the weighing platform is raised. It, of course, should be readily apparent that the indicia on the encoding disc 10 may be spaced apart so as to correspond to any other weight increment, as desired. For example, the width of each dark or light pattern, that is, the spacing between successive light-dark and dark-light transitions, may correspond to 0.05 pound.

The UP output of the steering circuit 110 is connected to a pulse counter which, in one embodiment, is comprised of a counting chain formed of serial counters 112, 114 and 116. Each of these counters is a conventional UP/DN counter having a count up input and a count down input. As is appreciated, pulses applied to the count UP input are adapted to increment the count of the UP/DN counter and, conversely, pulses applied to the count down input are adapted to decrement the count of the UP/DN counter. For the case wherein the indicia on the encoding disc represent ½ ounce increments, the counter 112 is adapted to counter the number of pulses representing ounces and to produce a one pound output pulse after sixteen ounces have been counted. Accordingly, the counter 112 may be considered to be an ounce counter and may be comprised of a binary counter. It is appreciated that, since there are 16 ounces to a pound, and since a binary counter is readily adapted to count to sixteen before being reset, a conventional binary counter is well-suited as an ounce counter.

The one pound pulses produced by the counter 112 are adapted to be counted by the counter 114. Preferably, the counter 114 is a decimal counter which is adapted to count, in decimal form, the number of one pound pulses which are applied thereto. It is appreciated that this decimal counter 114 is adapted to be incremented from zero to nine pounds and, once a count of nine pounds has been reached, is reset to zero upon the occurrence of the next one pound pulse. Upon being reset, the counter 114 is adapted to produce a ten pound pulse. These ten pound pulses are adapted to be counted, in decimal form, by the counter 116 which, preferably, comprises a decimal counter. The counter 116 may be substantially identical to the counter 114. Thus, the counter 116 is adapted to be incremented from a count of zero to a count of nine in response to each ten pound pulse applied thereto. Once a count of nine has been reached, a one hundred pound output pulse is produced by the counter 116 in response to the next ten pound pulse applied thereto. Thus, in the counting chain illustrated in FIG. 2A, it is appreciated that the counters 114 and 116 may be designated as the one pound counter and ten pound counter, respectively. The cumulative counts which are obtained by these one pound and ten pound counters represent, in decimal form, the total pounds of the parcel which is weighed. Thus, the combination of the ounce counter 112, the one pound counter 114 and the ten pound counter 116 is capable of accumulating a count representing the total pounds and ounces of the weighed parcel.

The contents of the counters 112, 114 and 116 are adapted to be displayed so as to provide a visual display of the parcel weight. Accordingly, the respective stages in each of the counters are connected to corresponding inputs of display drivers 120, 124 and 128, respectively, which, in turn, drive the weight displays 122, 126 and 130. In one embodiment, each of the displays is a conventional seven-segment display and each of the display drivers is adapted to drive its associated display in accordance with a binary coded decimal (BCD) signal applied thereto. Thus, the decimal counters 114 and 116 are connected directly to the drivers 124 and 128, respectively. However, since the ounce counter 112 preferably is a binary counter, the respective stages of this counter are connected to the display driver 120 through a suitable decoder 118. The decoder 118 is a conventional binary-to-decimal converter. Thus, depending upon the contents of the respective ounce, pound and ten pound counters, a corresponding ounce, pound and ten pound display are provided by the displays 122, 126 and 130, respectively.

Since the counters 112, 114 and 116 are UP/DN counters, it is appreciated that, depending upon the number of count down pulses which are applied to the counting chain, the total count exhibited thereby can be decremented below a zero count. For example, if pulses are applied to the DN output of the steering circuit 110, it is possible to decrement the ounce, pound and ten pound counters from, for example, 0 pound, 1 ounce to 0 pounds, 0 ounces, to 99 pounds, 15 ounces. The transition from 0 pounds, 0 ounces to 99 pounds, 15 ounces, corresponds to, for example, a negative weight of −1 ounce. To detect this transition, the conventional output terminals of the ten pound counter 116 are used as overflow terminals. When the ten pound counter 116 is decremented, a change in its count from 0 to 9 (corresponding to a change in weight from 0 pounds to 99 pounds) results in an output pulse at the output terminal 117. When the ten pound counter 116 is incremented so as to change its count from 9 to 0 (corresponding to a change in weight from 99 pounds to 0 pounds) an output pulse is provided at the terminal 119. These respective overflow output pulses are sensed by a flip-flop circuit 132 which is connected to the respective overflow terminals 117 and 119. The flip-flop circuit may be a conventional set/reset bistable multivibrator having set and reset inputs and 1 and 0 outputs. As is conventional, the flip-flop circuit 132 is adapted to be set in response to a pulse applied to its set input and is adapted to be reset in response to a pulse applied to its reset input. When set, a predetermined potential is applied to the 1 output of the flip-flop circuit 132. For the purpose of establishing a convention to facilitate a ready understanding and explanation of the illustrated logic circuitry, it will be assumed that a relatively positive potential corresponds to a binary "1" and a relatively negative potential corresponds to a binary "0". Alternatively, the binary "1" may be represented by a relatively higher voltage than the representation of the binary "0". Of course, if desired, the converse of this representation can be used. Thus, consistent with the foregoing convention, when the flip-flop circuit 132 is set, a binary "1" is applied to the 1 output thereof. This binary "1" is applied to each of the display drivers 120, 124 and 128 and is used as an inhibit signal. That is, the display drivers are prevented from driving their respective displays when the flip-flop circuit 132 produces its inhibit signal. Thus, in the event that the counting chain is decremented below the zero weight level, all of the display drivers are inhibited so that the "negative" weight which is represented by the count then obtaining in the counting chain is not displayed. This inhibit signal produced at the 1 output of the flip-flop circuit 132 is additionally supplied to an inhibit circuit described in greater detail hereinbelow with respect to FIG. 2C. It may be appreciated that, when the counting chain is incremented so that the "negative" count exhibited thereby is increased to a zero count, the resultant overflow signal produced at the overflow terminal 119 serves to reset the flip-flop circuit 132 and thus to terminate the inhibit signal.

As discussed hereinabove with respect to FIG. 1, the encoded parcel weight is used as a portion of the memory storage location address. Many of the memory devices which can be used with the postage scale described herein generally rare compatible with a binary coded address. Accordingly, since the pound and ten pound counters 114 and 116, which represent the poundage of the parcel weight, are decimal counters, the decimal count exhibited thereby should be converted to a binary representation. To this effect, the BCD-to-binary converter 134 is connected to the decimal counters 114 and 116 so as to convert the binary coded decimal count attained by these counters to a binary representation from which a suitable memory address can be derived. The individual outputs of the converter 134 are connected, in parallel, to an address generator 136 which is described in greater detail hereinbelow with respect to FIG. 2C. The outputs of the converter 134 also are connected to an OR-circuit 137 for a purpose soon to be described. Finally, one of the converter outputs is connected to a memory select circuit 222. If the converter 134 is of the type which produces a 7-bit output signal, the most significant bit output is adapted to have a signal applied thereto when the BCD input to the converter exceeds 64 pounds. This signal, representing that the parcel weight is greater than 64 pounds, also is applied to a predetermined sector encoded in the memory, and will be described below.

The operation of the logic circuit which comprises the weight encoder should be readily apparent and, in the interest of brevity, a detailed description of its operation is not provided. It merely need be noted that when the encoding disc 10 rotates in the counterclockwise direction, indicative of a downward displacement of the scale weighing platform when a parcel is placed thereon, the indicia which are sensed by the phototransistors 104a and 104b cause the Schmitt triggers and the edge triggers to energize the steering circuit 110 such that weight increment pulses are applied to the UP output of the steering circuit. These pulses are used to increment the ounce counter 112 and, when the count of the ounce counter has been incremented so as to register 1 pound, a 1 pound pulse is applied to the 1 pound counter 114. This feeding forward of pulses is continued for the counter chain so that the ounce, pound and ten pound counters are incremented in response to the weight of the parcel. As these counters are incremented, the corresponding weight displays 122, 126 and 130 also are incremented. It is appreciated that the encoding disc 10 will rotate beyond its final steady-state position. Once this has occurred, the encoding disc will be rotated in the opposite, or clockwise direction, toward such steady-state position. During this clockwise rotation, the pulses which are produced by the phototransistors 104a and 104b result in the application of pulses to the DN output of the steering circuit 110.

These pulses cause the respective counters to be decremented until, ultimately, the pound and ounce count representing the correct parcel weight is stored in the counter chain. At that time, the respective displays also will display the proper parcel weight. The poundage portion of this weight representing count is converted from BCD format to binary code in the converter 134. Since the ounce counter 112 is assumed to be a binary counter, a similar conversion of the contents of this counter is not necessary.

Subsequently, when the parcel is removed from the weighing platform, the platform will be returned toward its reference position, with the concomitant clockwise rotation of the encoding disc 10. This clockwise rotation causes the counter chain to be decremented toward a count of zero. However, because of the mechanical structure of the apparatus, the encoding disc will be rotated beyond its reference position so as to overshoot the zero weight point. This means that the counter chain will be decremented below the zero weight level and a corresponding overflow pulse is applied to the overflow output 117 to set the flip-flop circuit 132, whereby the driver stages 120, 124 and 128 are inhibited. Once the encoding disc finally returns to its reference position, a representative overflow pulse is applied to the overflow terminal 119 so as to reset the flip-flop circuit 132 and terminate the inhibit signal which had been produced thereby. As the contents of the pound and ten pound counters 114 and 116 are changed, the converted binary signal produced by the BCD-to-binary converter 134 is correspondingly changed.

In the alternative embodiment wherein the indicia on the tracks 10a and 10b are provided at 0.05 pound intervals, the ounce counter 112 may be replaced by, for example, a 0.1 pound decimal counter. Such a decimal counter may be similar to the counters 114 and 116. Hence, the decoder 118 would not be necessary. Also, in order to generate the binary coded memory address, the respective stages of this 0.1 pound counter would be connected to the BCD-to-binary converter 134.

The Class and Zone Encoders

Figure 2B:
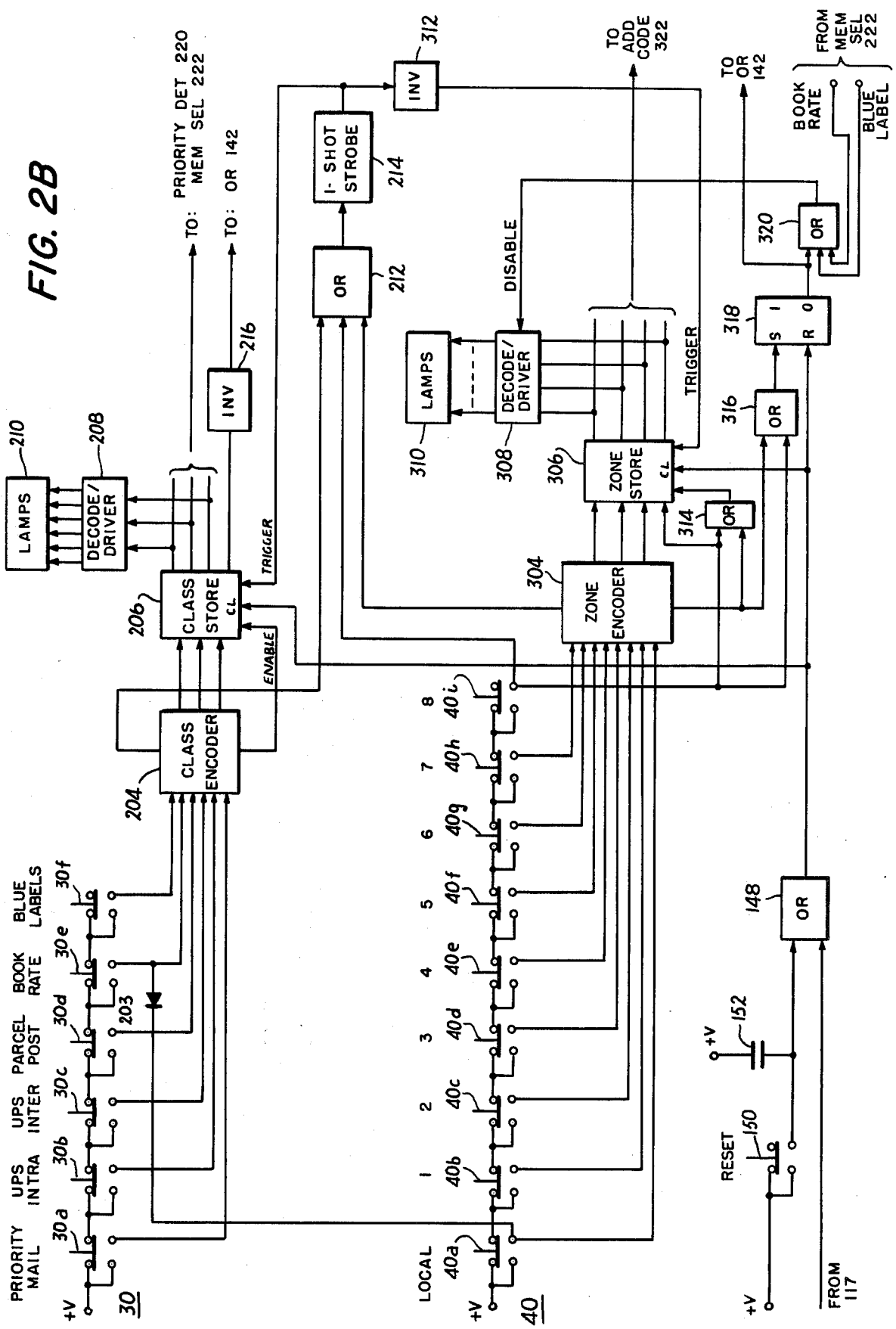

The logic circuit diagram of the class and zone encoders 32 and 42 of FIG. 1 is shown in detail in FIG. 2B. The class selector switches 30 are shown as push-button switches 30a–30f which are interlocked so as to enable the effective actuation of only a single switch. Such interlock can be either mechanical or electrical and, in the illustrated embodiment, is seen to be an electrical interlock. In particular, each of the push-button switches is comprised of an upper pair of contacts and a lower pair of contacts, the contacts in each pair being electrically interconnected by a spring-loaded contact. When all of the push-button switches are in their normal, or quiescent states, whereby the spring-loaded contact in each completes a circuit between the upper pair of contacts, it is seen that an electrical circuit extends from a suitable source of operating potential +V through all of the upper pairs of contacts which are connected in series. In each push-button switch, one of the upper pair of contacts is connected in common with one of the lower pair of contacts so that, when the spring-loaded contact is depressed, operating potential is applied to the lower pair of contacts. For example, if the parcel post push-button 30d is actuated, the series connection of all of the upper pairs of contacts is interrupted at the parcel post push-button and operating potential +V is supplied through the upper pair of contacts of the priority mail push-button 30a, through the upper pair of contacts of the UPS intrastate push-button 30b, through the upper pair of contacts of the UPS interstate push-button 30c and then to the lower pair of contacts of the parcel post push-button 30d.

Individual signal lines serve to connect one of the lower pair of contacts of each of the class push-button switches 30 to a corresponding input of a class encoder 204. Thus, depending upon which of the class push-button switches is actuated, a corresponding potential +V is applied to an associated signal line and, thereby, to the class encoder. In the illustrated embodiment, six individual class push-button switches are provided. Accordingly, the class encoder 204 is adapted to produce an encoded representation of the particular push-button switch 30 which has been actuated. Since any one of the six push-button switches can be actuated, the class encoder 204 is adapted to produce a 3-bit encoded representation identifying which of the switches has been actuated. This 3-bit encoded representation can be a binary code, a BCD code, or the like. As one example thereof, the class encoder 204 is a 3-bit encoder of the type produced by Motorola Semiconductor Division, Model 14532. This type of encoder also includes two additional output terminals, which may be designated the control and pulse output terminals, whereat output signals, such as a control signal and a pulse signal, respectively, are produced when the encoder is supplied with an input potential at any one of its input terminals. Alternatively, the class encoder 204 may be comprised of conventional gating circuits arranged as a 3-bit encoder and, preferably, with these additional gating output terminals.

A temporary storage circuit 206 is coupled to the class encoder 204 and is adapted to receive the 3-bit encoded representation of the particular class push-button switch which has been actuated. A typical storage circuit which can be used as the store 206 is produced by National Semiconductor Corp. and is identified as Model 74C173. It has been found that, in general, typical binary storage circuits are constructed as 4-bit stores. However, since the storage circuit 206 need merely store a 3-bit signal, the additional storage capacity thereof is used to indicate whether a class code produced by the class encoder 204 has been stored thereby. This indication is turned to account for detecting whether a class push-button switch has been properly actuated. Accordingly, the input to the last, or fourth, stage of the storage circuit 206 is adapted to be connected to the three used stages so as to be energized when any one of these three stages is supplied with a binary signal.

The class storage circuit 206 additionally includes a clear, or reset, input terminal, an enable input terminal and a trigger input terminal. The clear input terminal is adapted to receive a clear, or reset, signal, so as to reset all of the storage stages to an initial state. The enable input terminal of the class storage circuit 206 is connected to one of the additional outputs of the class encoder 204, such as the control output terminal. This enable input terminal is adapted to receive an enable signal so as to condition the class storage circuit 206 to store the 3-bit class encoded signal applied thereto. In order to store this signal, a trigger signal must be supplied to the trigger input terminal of the class storage circuit. This trigger input terminal is connected to a one-shot, or strobe, circuit, 204, soon to be described.

The outputs of the storage circuit 206, which represent the stored encoded representation of the actuated class push-button switch 30, are connected through a decoder drive circuit 208 to a display 210. A suitable decoder drive circuit is produced by RCA Semiconductor Division as Model 4028. Preferably, the display 210 comprises an array of light emitting devices, such as lamps, each being associated with a corresponding class of shipment. As is conventional, these lamps can be included in an integrated structure with the class push-button switches so as to indicate which of the push-button switches has been actuated. More particularly, the energized lamp will indicate which class of shipment is representatively stored in the storage circuit 206. Of course, the lamps need not be provided in the same housing as the push-button switches. Various alternative constructions are envisaged.

FIG. 2B also depicts the zone selector switches 40 which, as illustrated, are similar to the class selector switches 30. Accordingly, a signal line is associated with each of the local, 1, 2, 3, 4, 5, 6, 7 and 8 push-button switches 40a–40i. In addition, the book rate push-button switch 30e is connected through a diode 203 to the signal line which is coupled to the local zone push-button switch 40a. This connection provides a potential on the local zone signal line whenever the book rate push-button switch 30e is actuated.

All of the zone switch signal lines are connected to corresponding inputs of a zone encoder 304. This encoder is a 3-bit encoder which may be substantially identical to the aforedescribed class encoder 204 and is adapted to produce a 3-bit signal representing the particular one of the local, 1, 2, 3, 4, 5, 6 and 7 zone push-button switches which have been actuated. Also, two additional output terminals, such as control and pulse output terminals, are provided, these additional output terminals being supplied with signals, such as control and pulse signals, respectively, when the zone encoder is energized in response to an operating potential supplied to any one of the zone encoder inputs. The 3-bit zone encoded signal produced by the zone encoder 304 is applied to the zone storage circuit 306. This storage circuit is substantially identical to the aforedescribed class storage circuit 206 and may comprise a four stage storage device which is readily adapted to store a 4-bit signal.

It is appreciated that nine zone selector switches 40 are provided. It is known that a 4-bit digital signal is necessary to represent which of the nine zone selector switches has been actuated. However, since the zone encoder 304 is capable of producing a 3-bit signal, it is necessary to encode a fourth bit whenever the ninth zone selector switch 40i is actuated. This fourth bit encoding is achieved by connecting the lower pair of contacts of the push-button 40i to the input of the fourth stage of the zone storage circuit 306. Hence, whenever the push-button 40i is actuated, a corresponding signal is stored in the zone storage circuit 306.

The zone storage circuit 306 additionally includes a clear, or reset, input terminal which is adapted to receive a clear signal for a purpose soon to be described. This clear signal is effective to erase the contents of the zone storage circuit. The zone storage circuit 306 also includes an enable input terminal which is connected through an OR circuit 314 to the push-button 40i and to one of the additional output terminals of the zone encoder 304. As in the class storage circuit 206, the zone storage circuit is conditioned to store the encoded signal applied to its four stages when an enable signal is received at its enable input terminal. Finally, the zone storage circuit 306 includes a trigger input terminal adapted to receive a trigger signal whereby the zone storage circuit is enabled to store the encoded representation of the actuated zone selector switch 40. The trigger input terminal is connected through an inverter circuit 312 to the one-shot circuit 214.

The outputs of the zone storage circuit 306 are connected through a decoder drive circuit 308 to suitable zone indicating devices 310. The decoder drive circuit 308 is substantially identical to the aforedescribed decoder drive circuit 208 and the display devices 310 are similar to the class display element 210. Thus, the display devices 310 may comprise suitable light emitting devices, such as lamps, each being indicative of a corresponding destination zone which has been selected by the actuation of an associated zone selector switch 40. It is appreciated that the decoder drive circuit 308 is adapted to receive the stored 4-bit zone representing code and to drive a particular one of the zone indicating lamps corresponding to that 4-bit code. A suitable decoder drive circuit which can be used for the circuit 308 is produced by RCA Semiconductor Division, Model 4028.

There are some predetermined conditions wherein, regardless of the contents of the zone storage circuit 306, it is desired to disable the decoder drive circuit 308 so that none of the zone indicators 310 is energized. These conditions include the condition wherein none of the zone selector switches 40 has been actuated, when the book rate class of shipment has been selected and when the blue label class of shipment has been selected. Accordingly, a decoder drive disable circuit is provided, this circuit being comprised of OR circuits 316 and 320 and flip-flop circuit 318. The OR circuit 316 includes a pair of inputs which are connected to the push-button 40i and to one of the additional zone encoder output terminals, respectively. The output of this OR circuit is connected to the set input of the flip-flop circuit 318. The other OR circuit 320 is comprised of a three-input OR circuit having a first input connected to the 0 output of the flip-flop circuit 318, a second input adapted to be supplied with a signal when the book rate class of shipment has been selected and a third input adapted to be supplied with a signal when the blue label class of shipment has been selected. Although the second and third inputs of the OR circuit 320 can be connected directly to the push-button switches 30e and 30f, respectively, or to corresponding outputs of the class encoder 204 or the class storage circuit 206, it is preferred to connect the inputs of the OR circuit 320 to suitable output terminals of a memory select circuit 222, to be described. The output of the OR circuit 320 is connected to a disable input of the decoder drive circuit 308.

The flip-flop circuit 318 preferably is of the set/reset type, and its reset input is adapted to receive the clear, or reset, signal which is supplied to the class and zone storage circuits 206 and 306. This clear signal is produced by an OR circuit 148. As is seen, the output of this OR circuit is connected in common to the clear input terminals of the class and zone storage circuits and to the reset input of the flip-flop circuit 318. The OR circuit 148 is adapted to receive a reset pulse which is supplied to one of its inputs by a reset push-button switch 150. This reset push-button switch 150 includes a pair of normally open contacts which, when closed, applies a potential +V to the OR circuit 148. This same OR circuit input also is connected through a capacitor 152 to the source of operating potential +V. The purpose of this connection is to supply a reset signal to the OR circuit 148 when power to the postage scale first is turned on. The other input to the OR circuit 148 is connected to the overflow terminal 117 of the aforedescribed ten pound counter 116.

As mentioned hereinabove, the trigger signals which are supplied to the trigger input terminals of the respective class and zone storage circuits 206 and 306 are supplied by the one-shot circuit 214. The purpose of this one-shot circuit is to avoid the storage of erroneously produced class and zone encoded signals. More particularly, errors which might be caused by the inherent "bounce" of the push-button switches 30 and 40 are avoided by using the one-shot circuit 214 to supply trigger signals to the respective storage circuits. It is appreciated that this contact "bounce" causes an incomplete and, at times, an ambiguous signal to be applied to the selector switch signal line. This incomplete or ambiguous signal can result in an erroneous encoding, and thus storage, of a selected class and zone. This problem caused by contact "bounce" is avoided by using the one-shot circuit 214 whose input is connected through an OR circuit 212 to one of the additional output terminals of the class encoder 204 and to one of the additional output terminals of the zone encoder 304, such as the respective pulse output terminals. In addition, a third input of the OR circuit 212 is connected to one of the normally open contacts of the push-button switch 40i.

Before describing the operation of the class and zone encoding circuits, it should be pointed out that the OR circuits which are used herein are conventional and are adapted to produce an output signal when an input signal is supplied to any one or more of the OR signal input terminals. For the purpose of the present discussion, it will be assumed that the OR circuit produces a binary "1" when a binary "1" is applied to any of its input terminals, and a binary "0" is produced when none of the OR circuit input terminals is supplied with a binary "1". Also, the inverter circuits which are used herein are conventional logic sense inverters and are adapted to produce a binary "1" in response to a binary "0" applied thereto and, conversely, to produce a binary "0" in response to a binary "1" applied thereto.

In operation, let it be assumed that all of the lower pairs of contacts of the class push-button switches 30 are in their normally open states. Similarly, all of the lower pairs of contacts of the zone push-button switches 40 are in their normally open states. As an initial condition, neither the class encoder 204 nor the zone encoder 304 is energized, and the class and zone storage circuits 206 and 306 are, effectively, empty. Also, at this time, it is assumed that the flip-flop circuit 318 is reset such that a binary "1" is supplied from the 0 output through the OR circuit 320 to the disable input of the decoder driver circuit 308. Now, when a class push-button switch, such as the priority mail push-button 30a, is actuated, the normally open contacts thereof are closed so that a signal +V is applied over the priority mail signal line to a corresponding input of the class encoder 204. It should be noted that when the priority mail push-button 30a is actuated, operating potential +V is removed from all of the remaining class push-button switches because the normally closed upper contacts of the priority mail push-button now are opened. Hence, the subsequent operation of any of the other class push-button switches will have no effect upon the class encoder 204.

When the signal +V is received by the class encoder at its input corresponding to the priority mail signal line, a 3-bit encoded representation of priority mail selection is produced and is supplied to the class storage circuit 206. At the same time, since the class encoder 204 now is energized, an enable signal is supplied thereby to the enable input of the class storage circuit. Furthermore, a signal, such as a pulse signal, indicating that the class encoder 204 has been energized is supplied through the other additional output terminal thereof through the OR circuit 212 to energize the one-shot circuit 214. Following a suitable delay, the one-shot circuit 214 produces an output pulse whose positive edge serves as the trigger signal for the class storage circuit 206. At that time, the 3-bit encoded representation of priority mail is stored in the class storage circuit. Once this encoded representation is stored, the decoder drive circuit 208 energizes the proper class indicator to indicate that the priority mail selector switch has been actuated. Also, the stored encoded representation of the selected class of shipment is supplied to the memory select circuit 222, to be described, and to a priority class detector circuit 220. This circuit also will be described hereinbelow with reference to FIG. 2C.

It is recalled that, in one embodiment, the class storage circuit 206 is adapted to store a 4-bit signal, while the class encoder 204 merely is a 3-bit encoder. Accordingly, the fourth stage of the class storage circuit, which is not used to store a representation of the encoded class, nevertheless is energized whenever the class storage circuit is triggered and enabled to receive and store and encoded signal. This last stage is connected through the inverter circuit 216 to an OR circuit 142, to be described. Suffice it to say that the fourth stage of the class storage circuit 206 is energized only when the class storage circuit is triggered and enabled to receive and store a signal. At that time, the output of the inverter circuit 216 is changed from, for example, a binary "1" to a binary "0".

The trigger signal produced by the one-shot circuit 214 exhibits a finite duration. When this trigger signal terminates, its trailing edge is inverted by the inverting circuit 312 so as to supply a positive transition to the trigger input terminal of the zone storage circuit 306. However, if it is assumed that, at this time, none of the zone selector switches 40 have been actuated, then the zone encoder 304 will not have been energized and an enable signal will not be supplied to the enable input terminal of the zone storage circuit. Thus, without being properly conditioned, the trigger signal has no effect upon the zone storage circuit 306. If, now, one of the zone selector switches is actuated, for example, if the push-button 40d, associated with zone 3, is actuated, a signal is supplied to the signal line associated with this zone switch and a corresponding signal is applied to the associated input of the zone encoder 304. Being properly energized, the zone encoder 304 applies a 3-bit encoded representation of the actuated zone selector switch to the zone storage circuit 306 and, in addition, supplies an enable signal through the OR circuit 314 to the enable input terminal of the zone storage circuit and an energizing signal, such as a pulse signal, through the OR circuit 212 to the one-shot circuit 214. Since the zone 8 selector switch 40i has not been actuated (it was assumed that the zone 3 selector switch had been actuated), a corresponding fourth bit, such as a binary "0" is applied to the fourth input of the zone storage circuit 306.

After a predetermined delay following the energization of the one-shot circuit 214, the trigger pulse produced thereby is inverted and applied to the trigger input terminal of the zone storage circuit 306. This inversion applies a negative transition to the zone storage circuit trigger input terminal and does not permit this storage circuit to store the encoded representation of the actuated zone selector switch. However, once the one-shot pulse has terminated, the inverter circuit 312 applies the necessary positive transition to the zone storage circuit trigger input terminal, whereby this zone storage circuit now stores the 4-bit encoded representation of the actuated zone selector switch.

When the zone encoder 304 is energized, the enable signal which is supplied through the OR circuit 314 to the enable input terminal of the zone storage circuit 306 also is supplied through the OR circuit 316 to the set input of the flip-flop circuit 318. It is seen that this flip-flop circuit 318 is set only if a zone selector switch has been positively actuated. When in its set condition, the signal applied at the 0 output of the flip-flop circuit is changed from a binary "1" to a binary "0". This binary "0" effectively removes the disabling signal which had been applied to the disable input of the decoder drive circuit 308 and thus permits the encoded representation stored in the zone storage circuit 306 to be decoded and to drive corresponding one of the zone indicators. Thus, a visual indication of the selected zone is provided. The setting of the flip-flop circuit 318 also removes an inhibit signal which had been applied by the flip-flop circuit to an OR circuit 142 of the inhibit circuit, to be described.

If, after a class selector switch and/or a zone selector switch has been actuated, the operator desires to alter the class of shipment or to change the destination zone, it is necessary to clear the class and zone storage circuits 206 and 306 and then to select the proper class and/or zone. The clearing of the class and zone storage circuits is effected by actuating the reset push-button 150 which supplies a reset signal through the OR circuit 148 to the clear input terminals of the respective storage circuits. Alternatively, another class or zone selector switch, respectively, can be actuated without first clearing the associated storage circuit 206 or 306. For example, if another class is selected, for instance, by actuating the parcel post push-button 30d, the class encoder 204 is energized and supplies the corresponding encoded representation to the class storage circuit 206, together with the enable signal. The energization of the class encoder 204 results in the ultimate application of the trigger signal to the trigger input terminal of the class storage circuit by the one-shot circuit 214, whereby the encoded representation of the changed class is stored and is displayed by the appropriate class indicator 210. However, since none of the zone selector switches had been actuated, there is no change in the stored representation or display of the selected zone. This is because, in the absence of a positive zone selection, the zone encoder 304 is not energized; and the zone storage circuit 306 is not enabled to store a new zone representation. Hence, the previously stored zone representation is retained.

After the proper class and zone have been selected, and after the parcel has been placed upon the weighing platform, the appropriate postal rate is read out of the memory and is displayed, as will be described. The operator then will remove the parcel from the weighing platform. As described hereinabove with respect to FIG. 2A, once the parcel has been so removed, the weighing platform will overshoot its reference position and the encoder disc 10 will be rotated to decrement the counter chain such that the counters will represent a "negative" weight. That is, the overflow terminal 117 of the ten pound counter 116 will produce an overflow signal. This overflow signal is supplied through the OR circuit 148 as a clear signal for the class and zone storage circuits 206 and 306. Hence, once a postal rate determination operation has been completed, the class and zone storage circuits will be automatically cleared to await a subsequent operation.

Let it be assumed that, instead of the priority mail push-button 30a, the book rate push-button 30e had been actuated. In addition to energizing the class encoder 204, it is seen that the signal supplied to the book rate signal line is also supplied, through the diode 203, to the local zone signal line. Consequently, when only the book rate push-button is actuated, the proper class and zone representations thereof are stored in the class storage circuit 206 and the zone storage circuit 306, respectively. This encoded representation of the local zone is used in combination with the encoded representation of the parcel weight to address a suitable location in an associated sector of the memory, as will be described. Since book rate normally is not associated with any zone, it is preferred to disable the decoder drive circuit 308 from energizing the local zone lamp in response to the encoded representation of the local zone which is stored in the zone storage circuit 306. To this effect, a signal representing the selected book rate class is supplied as a disable circuit through the OR circuit 320 to the disable input terminal of the decoder drive circuit 308.

Let it be assumed that, when priority mail or parcel post, for example, have been selected, the zone 8 push-button 40i is actuated. Since none of the remaining zone selector switches have been actuated, the zone encoder 304 is not energized. Hence, the zone encoder does not supply an enable signal to the zone storage circuit 306 nor does the zone encoder energize the one-shot circuit 214. However, when the zone 8 push-button 40i is actuated, a corresponding signal potential is applied to the fourth stage of the zone circuit 306 and, through the OR circuit 314, an enable signal is supplied to the enable input terminal of the zone storage circuit. Furthermore, a suitable potential is supplied from this push-button to the OR circuit 212 to energize the one-shot circuit 214, whereby a trigger signal is applied to the trigger input terminal of the zone storage circuit. Hence, the encoded representation of zone 8 is stored in the zone storage circuit. Furthermore, the potential supplied to the zone 8 signal line is used to set the flip-flop circuit 318 via the OR circuit 316 so as to remove the disable signal from the decoder drive circuit 308 and to remove the inhibit signal which normally is supplied from the flip-flop circuit to the OR circuit 142.

It should be appreciated that the proper class representation and zone representation will be stored in the class and zone storage circuits, respectively, regardless of the sequence in which the class and zone switches are actuated. For example, if a class switch is actuated first, the one-shot circuit 214 will be energized to apply a trigger signal to the class storage circuit 206, whereby the encoded representation of the selected class can be stored therein. If, prior to the termination of this trigger signal, a zone selector switch is actuated, the encoded zone representation will be stored in the zone storage circuit 306 once the one-shot pulse has terminated because this negative transition in the one-shot pulse will be inverted and supplied as a trigger signal to the zone storage circuit. Of course, if the zone switch had been actuated subsequent to the termination of the one-shot pulse, the one-shot circuit 214 will be re-energized by the zone encoder 304 to supply the suitable trigger signal to the zone storage circuit. If a zone switch had been actuated first, an encoded representation of a subsequently actuated class switch will be stored in the class storage circuit 206 if the class switch is actuated prior to the time that the one-shot circuit 214 produces the trigger signal. However, if the class switch is actuated after the one-shot pulse produces the trigger signal, the class encoder 204 will subsequently re-energize the one-shot circuit to supply another trigger signal to the class storage circuit. The delay time and pulse interval associated with the one-shot circuit 214 are too small to permit erroneous operation of the illustrated apparatus by the manual actuation of the respective class and zone switches. Hence, the possibility of erroneous operation is virtually avoided.

Addressing Circuits

Figure 2C:
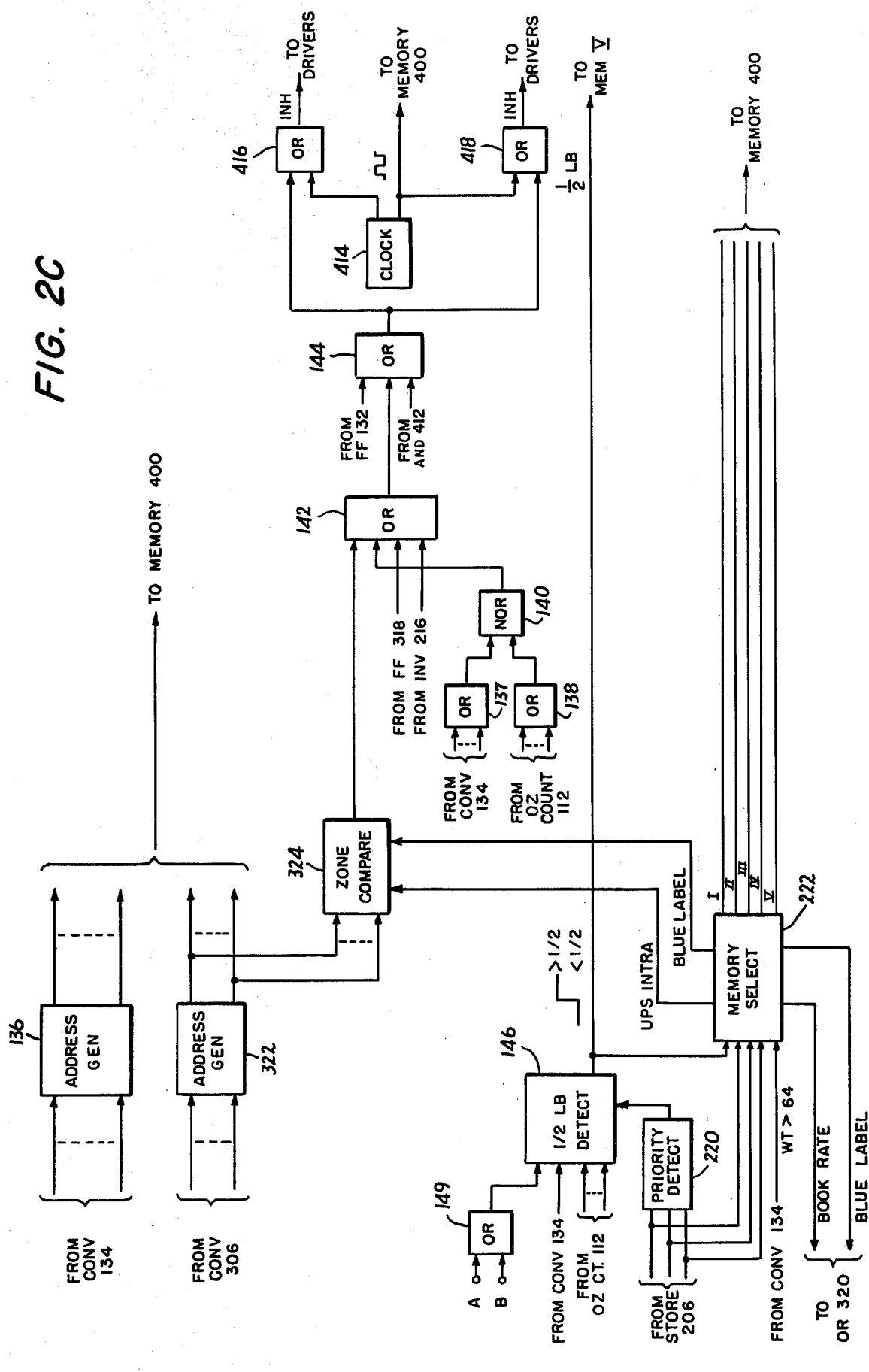

Referring now to FIG. 2C, there is illustrated the addressing circuits for the memory which is used with the postage scale described herein. It is recalled that the memory is a programmable ROM formed of plural sectors, each sector being provided on a removable printed circuit board or card. In each sector, the postal rate data is stored for each weight increment and for each destination zone. Accordingly, the encoded class representation which is stored in the class storage circuit 206 is used to select the proper memory sector and the binary representation of the parcel weight, as produced by the BCD-to-binary converter 134, in combination with the encoded representation of the selected destination zone stored in the zone storage circuit 306, are used to address the appropriate location in the selected sector. Accordingly, the addressing circuits are comprised of the memory select circuit 222, the $\frac{1}{2}$ pound detector 146, the address coder 322 and the address generator 136.

The memory select circuit 222 may comprise a decoding circuit having individually energizable output terminals and which is adapted to selectively energize one of such output terminals in response to the binary signals which are selectively applied to its input terminal. As will be described hereinbelow, the memory is comprised of five independently accessible sectors, each sector including an enable input terminal which is connected to a corresponding one of the memory select output terminals I, II, III, IV and V. One embodiment of such a memory select circuit is comprised of a circuit such as Model 14556, produced by Motorola Semiconductor Division, in combination with additional gating circuitry which will be obvious to one of ordinary skill in the art. The inputs to the memory select circuit 222 are connected to the class storage circuit 206 to receive the stored encoded representation of the actuated class switch 30. Depending upon the encoded representation of the selected class, a corresponding one of the output terminals I-V will be energized.

It is recalled that some classes of shipment permit only a limited number of destination zones. Consequently, the amount of postal rate data which must be stored for these classes is relatively small. It is, therefore, economically beneficial to provide a single memory sector to be shared by two or more classes of shipment. Also, for those classes which require a postal rate storage capacity which is greater than the storage capacity of one memory sector, the excess postal rate data is stored in another sector. The memory select circuit 222 is capable of supplying an energizing signal to an appropriate one of its energizing output terminals so as to take all of these conditions into account. For example, parcel post and priority mail both accommodate the shipment of parcels of up to 70 pounds. However, parcel post is provided with a greater number of distinguishable destination zones than priority mail. Hence, in one embodiment, the postal rate data for parcels in excess of, for example 64 pounds, for parcel post are stored in an additional sector. The memory select circuit 222 accommodates this storage arrangement by providing alternate sector selection when parcel post is selected. For example, the memory select circuit has the capability of selecting the parcel post memory sector when the parcel post class selector switch is actuated and the weight of the parcel is less than 64 pounds, and the capacity of selecting the additional memory sector when the weight of the parcel is greater than 64 pounds. This capability is achieved by providing an additional input to the memory select circuit from the aforedescribed most significant bit of the BCD-to-binary converter 134. Thus, when the parcel weight is greater than 64 pounds, a suitable signal is applied to this additional input of the memory select circuit 222.

As another example of the need to provide flexibility in the selection, or access, of particular memory sectors, it is noted that, in addition to providing distinct postal rates for whole pound increments of parcel weight, priority mail also provides different postal rate data for parcels having $\frac{1}{2}$ pound weight increments up to 5 pounds. The additional $\frac{1}{2}$ pound postal rate data might exceed the storage capacity of the priority mail sector in the memory. In that event, the $\frac{1}{2}$ pound postal rate data for priority mail will be stored in a different sector. Accordingly, it is necessary to access that different sector when priority mail is selected and the postal rate is to be determined based on a parcel weight of a $\frac{1}{2}$ pound increment. this can be accommodated by providing the memory select circuit 222 with still another input which is connected to the $\frac{1}{2}$ pound detector circuit 146. As will be described below, the $\frac{1}{2}$ pound detector circuit is adapted to detect when the parcel weight is less than or greater than $\frac{1}{2}$ pound increment and to supply the memory select circuit 222 with a suitable input signal to thereby permit the memory select circuit to access the appropriate memory sector whereat the $\frac{1}{2}$ pound postal rate data is stored. The $\frac{1}{2}$ pound detector circuit 146 is adapted to produce, for example, a binary "1" when the parcel weight is greater than $\frac{1}{2}$ pound increment and to produce a binary "0" when the parcel weight is less than a $\frac{1}{2}$ pound increment. In addition to being connected to an input of the memory select circuit 222, the $\frac{1}{2}$ pound detector output is connected to a particular memory sector, to be described.

Since $\frac{1}{2}$ pound weight data is significant for determining the postal rate only if the priority mail class of shipment has been selected, the $\frac{1}{2}$ pound detector circuit 146 is enabled only when priority mail is selected. Accordingly, the $\frac{1}{2}$ pound detector circuit includes an enable input terminal for receiving an enable signal which is adapted to be produced by a priority class detector circuit 220. As shown, the priority class detector circuit includes plural inputs which are connected to corresponding stages of the class storage circuit 206. The priority class detector circuit may comprise a gating network which is adapted to detect when the encoded class representation stored in the class storage circuit 206 corresponds to priority mail.

The ½ pound detector circuit 146 also includes input terminals for receiving data representing the weight of the parcel. These input terminals are connected to the ounce counter circuit 112 so as to receive data representing the weight of the parcel in ounces. Of course, if this ounce data represents that the parcel weight is between 9 ounces and 15 ounces, the ½ pound detector circuit 146 indicates that the parcel weight is greater than a ½ pound increment. Also, if the ounce data represents that the parcel weight is between 0 and 7 ounces, the ½ pound detector circuit indicates that the parcel weight is less than ½ pound. There is a factor of ambiguity if the ounce data represents that the parcel weight is 8 ounces. This ambiguity is due to the fact that when the ounce counter 112 registers a count corresponding to 8 ounces, it is possible that the parcel weighs between 7 and 8 ounces or between 8 and 9 ounces. Of course, if the parcel weight is between 7 and 8 ounces, the weight is less than a ½ pound increment; and if the parcel weight is between 8 and 9 ounces, the parcel weight is greater than a ½ pound increment. To avoid this ambiguity, the position of the encoding disc is sensed. More particularly, the pulses which are produced by the Schmitt tirggers 106a and 106b are used as an indication of whether the parcel weight is between 7 and 8 ounces or between 8 and 9 ounces. It is appreciated that if the track 10a is shifted with respect to the track 10b by 90° relative to the cycle of the light and dark patterns, then a pulse will be produced by one or the other of the Schmitt triggers 106a and 106b for 270° of this distance. Since each of these pulses corresponds to a ½ ounce increment, the only time that neither of Schmitt trigger 106a nor the Schmitt trigger 106b produces an output pulse is when the parcel weight is slightly less than this ½ ounce increment. Accordingly, an OR circuit 149 is provided to sense when neither of these Schmitt triggers produces an output signal, and this information is supplied to the ½ pound detector circuit 146 to avoid the aforenoted ambiguity. By so detecting the relative position of the encoding disc 10, the ½ pound detector circuit is capable of discriminating between a weight increment of 8− ounces and 8+ ounces. As is appreciated, the inputs to the OR circuits 149 are supplied from the Schmitt triggers 106a and 106b, respectively.

A further input to the ½ pound detector circuit 146 is supplied from the BCD-to-binary converter 134 and represents the weight of the parcel in pounds. Since ½ pound postal rate data is not provided when the parcel weight exceeds, for example, 5 pounds, it is advantageous to sense when the parcel weight exceeds this limits so that the ½ pound detector circuit need no longer be used. Accordingly, when the binary representation of the poundage of the weighed parcel, as supplied by the converter 134, exceeds this limit, which may be set at, for example, 5 pounds, 6 pounds, 7 pounds or 8 pounds, or any other desired amount, the ½ pound detector circuit 146 no longer provides the aforenoted ½ pound information.

While the ½ pound detector circuit 146 may comprise a gating circuit for utilizing all of the weight information which is supplied thereto, a preferred embodiment of a read only memory. A typical read only memory which can be used as the ½ pound detector circuit 146 is manufactured by the Harris Semiconductor Division of Harris Intertype Corp., Model HD1024. It may be appreciated that, when such a read only memory is used, the ounce representation supplied by the ounce counter 112, the disc position representation supplied by the OR circuit 148 and the poundage representation supplied by the BCD-to-binary converter 134 all may be used to address various memory locations therewithin. Depending upon each addressed memory location, the data stored therein will represent that the parcel weighs more than a ½ pound increment or less than a ½ pound increment, accordingly. This is the ½ pound weight information which is supplied by the ½ pound detector circuit 146 to the memory select circuit 222 and to a particular sector in the memory, as will be described.

Once the appropriate sector in the memory has been selected, it is necessary to address a particular storage location in that sector so as to read out the postal rate data stored thereat. Since the postal rate for a given class of shipment is dependent upon the weight of the parcel and the particular destination zone, the postal rate information is stored in the memory sector as a function of parcel weight and destination zone. Accordingly, the address for each storage location is a composite of the parcel weight, as determined by the counter chain, and the destination zone, as selected by actuation of a particular zone selector switch 40. In this regard, an address generator 136 and an address coder 322 are provided. The address generator 136 is adapted to produce a multi-bit address in accordance with the binary representation of the parcel weight. Accordingly, one embodiment of the address generator 136 is a code converter having plural inputs connected to corresponding outputs of the BCD-to-binary converter 134 and plural outputs which are connected to corresponding address lines of each of the memory sectors, to be described. The purpose of the address generator is to convert the binary representation of parcel weight to a code which is compatible with the memory sector. One embodiment of such an address generator is a code converter produced by Motorola Semiconductor Division, Model 14008. Of course, if the memory devices are addressable by the binary code which is produced by the converter 134, the address generator 136 can be omitted. As a further alternative, the address generator may comprise conventional gating circuits interconnected in conventional form so as to provide the code converting capability.

The address coder 322 is adapted to perform a similar function as the address generator 136 and includes plural inputs which are connected to corresponding stages in the zone storage circuit 306 and plural outputs. The address coder 322 is adapted to convert the stored representation of the selected zone to a form which is well-suited for addressing the memory sectors. One embodiment of such an address coder is a code converter of the type produced by RCA, Model 4008. As was mentioned hereinabove, if the coded representation stored in the zone storage circuit 306 is compatible with the memory device, the address coder 322 can be omitted.

The combination of the address code produced by the address generator 136 and the address code produced by the address coder 322 from the address of a storage location in an accessed memory sector. Thus, depending upon the particular sector which is accessed by the memory select circuit 222, the storage location which is addressed by the combination of the address generator 136 and the address coder 322 is read out.

In order to facilitate an understanding of the operation of the memory selector and the ensuing description of the memory device, it will be assumed that the memory is provided with five sectors, comprising sector I wherein parcel post rate information is stored, sector II wherein priority mail rate information is stored, sector III wherein interstate UPS rates are stored, sector IV wherein intrastate UPS rates are stored and sector V wherein miscellaneous postal rates are stored, such as half pound postal rates for priority mail, postal rates for priority mail, book rate and parcel post wherein the parcel weight is between 64 and 70 pounds. In addition, book rate rates may be stored in sector II with priority mail rates; and blue label rates may be stored in sector IV together with intrastate UPS rates. Of course, it should be realized that the postal rates which are stored in these particular sectors merely are illustrative and are not intended to limit the present invention. This particular storage segregation will be discussed merely to facilitate a ready understanding of the postage scale.

Now, depending upon which of the class selector switches 30 has been actuated, as determined by the encoded representation thereof, stored in the class storage circuit 206, the memory select circuit 222 will energize a corresponding one of its output terminals. In addition, if book rate had been selected, not only is output terminal II energized, but an auxiliary output also is energized to supply a disabling signal to the OR circuit 320, as has been described hereinabove. Similarly, if the blue label selector switch had been actuated, output terminal IV of the memory select circuit 222 is energized and another auxiliary output terminal is energized to supply a disable signal to the OR circuit 320.

It is appreciated that, regardless of the particular class selector switch which has been actuated, the ½ pound detector circuit 146 will be supplied with ounce data from the ounce counter 112, with disc position data from the OR circuit 149 and with poundage data from the BCD-to-binary converter 134. However, this data which is supplied to the ½ pound detector circuit will not be utilized thereby until the detector circuit is enabled, i.e., only when the priority mail class detector circuit 220 detects that the encoded representation stored in the class storage circuit 206 represents that the priority mail selector switch 30a had been actuated. At that time, the ½ pound detector circuit 146 is enabled to utilize the data supplied thereto so as to determine whether the parcel weight is less than or greater than a ½ pound increment (provided the parcel weight is less than the predetermined limit established by the poundage data supplied to the ½ pound detector circuit). This determination then is supplied to the memory select circuit 222 and, as will be described, to memory sector V. Depending upon the signal supplied to the memory select circuit 222 by the ½ pound detector circuit 146, the memory select circuit will energize either its output terminal II or its output terminal V. This latter output terminal is, of course, energized to select the memory sector V whereat the ½ pound postal rate data is stored.

If the most significant bit produced by the BCD-to-binary converter 134 indicates that the parcel weight more than 64 pounds, this indication is supplied to the memory select circuit 222 and, if the encoded representation of the selected class indicates that priority mail, parcel post or book rate had been selected, then the memory select circuit energizes its output terminal V.

The Inhibit Circuits

In accordance with one feature of the present invention, the data which is stored at an addressed location in the memory device is prevented from being displayed upon the occurrence of predetermined conditions. These conditions include: (a) the counter chain represents that a "zero" weight is on the weighting platform; (b) the counter chain indicates that a "negative" weight is on the weighing platform; (c) a class selector switch 30 has not been actuated; (d) a zone selector switch 40 has not been actuated; and (e) an improper zone selector switch has been actuated. A further inhibit condition is provided, as will be discussed in detail below.

a. "Zero" weight: Initially, when the weighing platform, and thus the encoding disc 10, are at their respective reference positions, it is desired that no postal rate data be displayed, even if the class and zone selector switches have been properly actuated. This reduces the possibility of confusing the postage scale operator. Accordingly, a "zero weight" detector is provided to sense when the weighing platform is at its reference position. This zero weight detector is comprised of OR circuits 137 and 138 and a NOR circuit 140. The OR circuit 137 includes multiple inputs which are connected to corresponding outputs of the BCD-to-binary converter 134. The OR circuit 138 includes multiple inputs which are connected to the respective counting stages of the ounce counter 112. It may be appreciated that, if desired, the OR circuits 137 and 138 may be combined in a single circuit. The NOR circuit 140 is conventional and is adapted to produce a binary "1" when a binary "0" is supplied to each of its inputs. As shown, the inputs of the NOR circuit 140 are connected to the respective outputs of the OR circuits 137 and 138. Accordingly, if the counter chain has not been incremented, each stage in the ounce counter 112 will store a binary "0" and the OR circuit 138 will supply a binary "0" and the OR circuit 138 will supply a binary "0" to the NOR circuit 140. Also, a binary "0" will be provided in each stage of the pound counter 114 and the ten pound counter 116, resulting in a binary "0" at each output terminal of the BCD-to-binary converter 134. This condition is sensed by the OR circuit 137 which supplies a binary "0" to the other input of the NOR circuit 140. Upon being supplied with a binary "0" at each of its input terminal, the NOR circuit 140 produces a binary "1" which represents the condition of "zero" weight. This zero weight indication is supplied through an OR circuit 142, another OR circuit 144 and a pair of OR circuits 416 and 418 as an inhibit signal to inhibit the display of postal rate data during this condition.

b. Negative weight: As described in detail hereinabove, it is expected that, when a parcel is removed from the weighing platform, the platform, and thus the encoding disc 10, will return to and then overshoot their respective reference positions. This is represented by decrementing the counter chain below a count of zero to a count which can be considered to represent "negative" weight. This decrement of the count of the counter chain is accompanied by an overflow signal at the overflow terminal 117 which sets the flip-flop circuit 132. Hence, when the flip-flop circuit is set, it represents the condition of "negative" weight. This condition is detected by the OR circuit 144 which includes an additional input connected to the 1 output terminal of the flip-flop circuit 132. Hence, once the flip-flop circuit is set to indicate a "negative " weight condition, a binary "1" is supplied to the OR circuit 114 and is, in turn, supplied as an inhibit signal through the OR circuits 416 and 418 to thereby the display of postal rate data which may be read out of the memory at this time.

c. Failure to actuate a class selector switch: As discussed hereinabove, when a class selector switch is actuated so that the normally open contacts thereof are closed, a corresponding signal is supplied over an associated signal line to the class encoder 204, thereby energizing the class encoder. When the class encoder is thus energized, a suitable encoded representation of the actuated class selector switch is produced and is stored in the class storage circuit 206. It is recalled that this class storage circuit includes an additional stage which is not necessary for storing one of the bits of the encoded class representation. This is because, in the described embodiment, the encoded representation is a 3-bit word, whereas the class storage circuit has a 4-bit storage capacity. Nevertheless, this fourth stage is supplied with a predetermined signal, such as binary "1", when any one of the other three stages is supplied with a binary "1". This means that, once the class encoder 204 is energized, the fourth stage of the class storage circuit 206 likewise is energized. Therefore, an indication of the failure to actuate a class selector switch is represented by the binary "0" which is stored in the forth stage of the class storage circuit 206, this binary "0" being inverted by the inverting circuit 216 and supplied as a binary "1" to the OR circuit 142. This, in turn, is transmitted through the OR circuit 144 and then as an inhibit signal through the OR circuits 416 and 418 to thereby inhibit a display of data stored in an addressed memory location during this condition. Of course, once the class encoder 204 is properly energized, the binary "0" which is stored in the forth stage of the class storage circuit 206 is changed to a binary "1", thereby the inhibit signal which previously had been generated.

d. Failure to actuate a zone selector switch: It is recalled that, when any one of the zone selector switches is actuated so as to close the normally open contacts thereof, either the zone encoder 304 is energized or a signal is applied to the signal line connected to the zone 8 selector switch 40i. The energization of the zone encoder or the application of a signal to the zone 8 signal line results in the setting of the flip-flop circuit 318. Thus, it is recognized that, when none of the zone selector switches 40 has been actuated, the flip-flop circuit 318 remains in its reset state to thereby supply a binary "1" to the OR circuit 142 from the 0 output terminal of this flip-flop circuit. This signal to the OR circuit 142 is, in turn, transmitted through the OR circuit 144 and then through the OR circuits 416 and 418 as an inhibit signal to thereby inhibit the display of data which may be read out of the memory device during this condition. Of course, when a zone selector switch has been properly actuated, the setting of the flip-flop circuit 318 removes the binary "1" from the OR circuit 142 to thereby terminate the inhibit signal.

e. Improper zone: There are some classes of shipment which permit only particular destination zones to be selected. As an example, if UPS intrastate shipment is selected, this class of shipment contemplates that the local zone as well as one or two other zones may be selected, depending upon the particular rate structure of that state. As another example, if blue label shipment is selected, this class contemplates, at most, four different zones. Thus, it is advantageous to detect whether the selected destination zone is compatible with UPS intrastate and blue label classes of shipment. This determination is made by a zone comparator 324. The zone comparator includes input terminals which are connected to the output terminals of the address coder 322. In addition, further input terminals are connected to the memory select circuit 222, these further input terminals being adapted to receive signals representing that UPS intrastate or blue label classes, respectively, have been selected. Upon receiving a signal indicating that UPS intrastate shipment has been selected, the zone comparator 324 is energized to compare the selected zone, as represented by the address produced by the address coder 322, to preset zones to determine whether an improper zone has been selected. A similar comparison is made if the zone comparator 324 receives a signal representing that blue label shipment has been selected. In event that an improper zone has been selected, for example, if the selected zone is to high for the particular class of shipment, the zone comparator 324 supplies an output signal to the OR circuits 142 which, in turn, is transmitted through the OR circuit 144 to the OR circuits 416 and 418 to thereby provide an inhibit signal so as to inhibit the display of data which may be read out from the memory during this condition. One example of a zone comparator which can be used is, for example, a 3-bit comparator produced by Motorola Semiconductor Division, Model 14585. Of course, if desired, other comparator devices can be constructed of gating networks whereby an encoded zone representation is compared to a reference preset zone when particular classes of shipment have been selected.

It may be appreciated that, if available, the individual OR circuits 137, 138, 142, 144, 416 and 418 can be combined in a single multiple input OR gating device. The reason for using individual OR circuits 416 and 418 will become apparent from the forthcoming description. It may also be appreciated that the OR circuits 137 and 138 and the NOR circuit 140 may be combined into a single multiple input NOR gate. As a further alternative, a single OR gate connected in series with an inverter circuit may be used, if desired.

Memory and Postal Rate Display

Figure 2D:
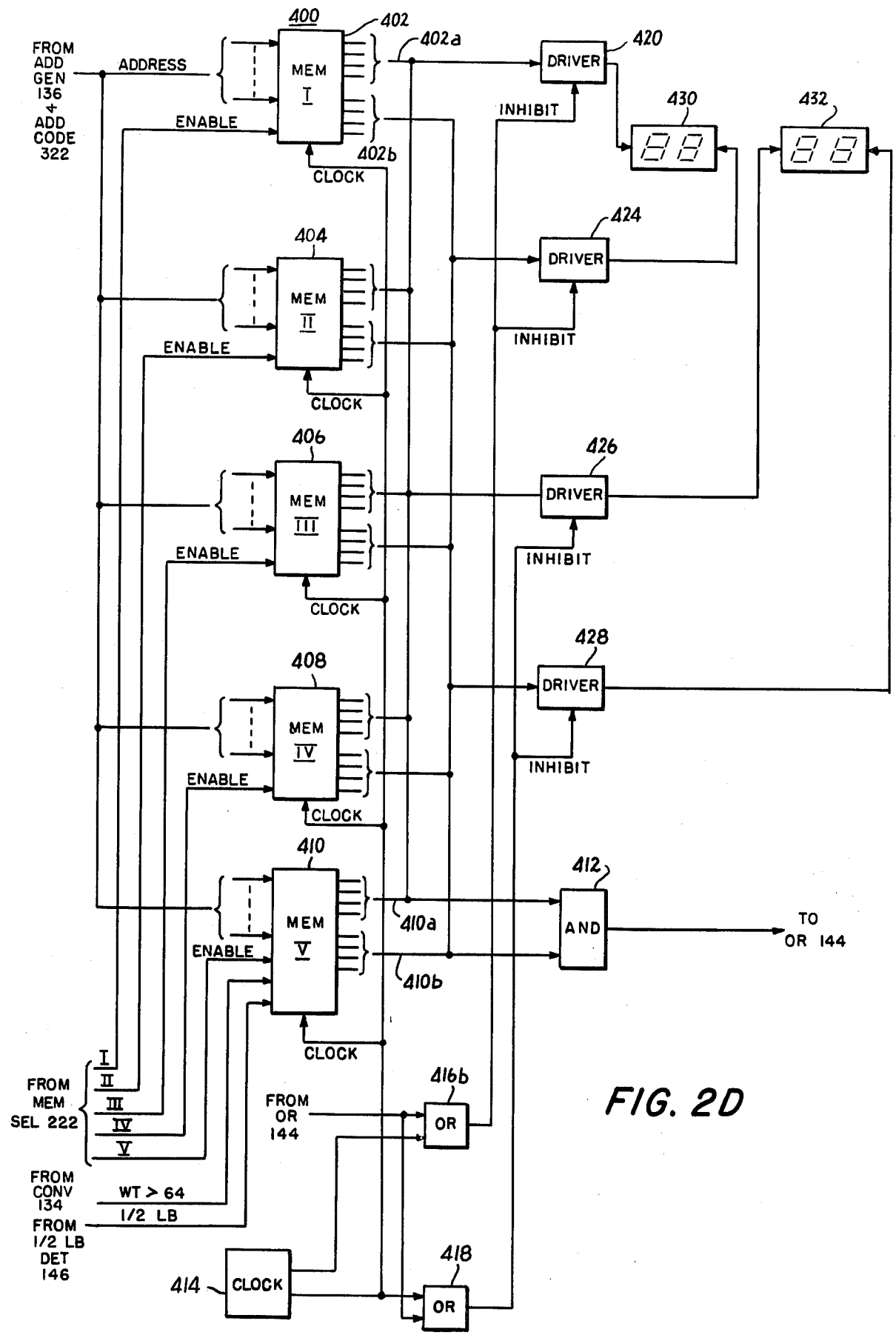

As discussed hereinabove, the memory device preferably is programmable read only memory and is divided into individual sectors, such as five sectors, each being provided on a removable printed circuit board or card. This facilitates easy removal and replacement of individual memory sectors to account for postal rate revisions as they occur. For this reason, it is preferred to associate sectors I, II, III and IV with postal rate date for parcel post, priority mail and book rate, UPS interstate and UPS intrastate and blue label, respectively. Memory sector V is adapted to store postal rate data for half pound increments of parcel weight with respect to priority mail and postal rates for a parcel weighing between 64 and 70 pounds for priority mail, parcel post and book rate. These respective memory sectors are depicted as sectors 402, 404, 406, 408 and 410, respectively; the composite of these sectors comprising the memory 400 as shown in FIG. 2D.

Each memory sector is of the type having plural storage location therein, each storage locations beng divided into two parts. Both parts of each storage location are addressed by the same address code which is supplied to the memory sector by the combination of the address generator 136 and the address coder 322, as described hereinabove. The first and second parts of the addressed storage location will be read out in sequence, that is, on a time-sharing basis, provided the memory sector is enabled. It is appreciated that each memory sector includes an enable input which is connected to a corresponding output terminal I, II, III, IV and V of the memory select circuit 222. Thus, depending upon which of the memory select output terminals is energized, the corresponding memory sector is enabled. Once the memory sector is enabled, the postal rate data which is stored in the respective parts of the addressed storage location is read out therefrom in accordance with a timing signal which is supplied to the memory sector. More particularly, each memory sector includes a timing signal input terminal, these terminals being connected in common and being adapted to receive a periodic timing signal produced by a suitable clock generator 414. One cycle of the clock generator is comprised of a positive pulse followed by a negative pulse, these pulses being supplied to the timing pulse input terminal of each of the memory sectors. As an example, a first part of the addressed storage location is adapted to be read out during the positive pulse timing interval and the second part of the same addressed location is adapted to be read out during the negative pulse timing interval. Hence, during each clock cycle, all of the data stored in the addressed location, i.e., the data stored in the first and second parts, is read out. The time required to fully read out both parts of and addressed location may be considered to be the multiplex cycle for the memory 400.

It may be appreciated that, if desired, each addressed location may be formed of four or more parts, each part being read out during a portion of the multiplex cycle. This multiplex cycle can be defined by the clock generator 414, for example, two or more clock cycles, and the techniques which are used with such a multiplex cycle are well known to those of ordinary skill in the art.

The postal rate data which is stored in each addressable location in the memory sector is in terms of dollars and cents. Of course, such data is stored in encoded form, such as BCD code. In one example, the data representing dollars is stored as a two-digit number in the first part of the addressable location and the data representing cents is stored as a two-digit number in the second part. Thus, during a first part of the multiplex cycle, the data representing dollars is read out from the addressed location, and during the second part of the multiplex cycle the data representing cents is read out of the addressed location. A typical programmable ROM which can be used for each memory sector has a storage capacity of eight data bits for each part of an addressed location. Since the BCD code is a 4-bit code representing numerals 0–9, each memory sector preferably is comprised of a first read out terminal for reading out a 4-bit encoded representation of one decimal digit and a second read out terminal for reading out the 4-bit encoded representation of the other decimal digit. For example, the first decimal digit may be a tens digit and the second decimal digit may be a units digit. Thus, during a first part of the multiplex cycle, the data representing the dollars portion of postal rate is read out as a two-digit number and during a second part of the multiplex cycle the data representing the cents portion of the postal rate is read out, also as a two-digit number.

In the preferred embodiment of the postage scale, the postal rate data is displayed in the form of visual displays, such as LED arrays, suitable numerical indicator lamps, seven-segment arrays, and the like. As illustrated in FIG. 2D, these displays 430 and 432 each are comprised of two seven-segment arrays. The display 430 is adapted to display dollars as a two-digit number and the display 432 is adapted to indicate cents as a two-digit number. The tens portion of the display 430 is driven by a suitable seven-segment driver 420 and the units portion of the display 430 is driven by the driver 434. The tens portion of the display 432 is driven by the driver 426 and the units portion of the display 432 is driven by the driver 428. The driver 420 and the driver 426 are connected in common to the first read out terminal of each of the memory sectors 402, 404, 406, 408 and 410, respectively. The drivers 424 and 428 are connected in common to the second read out terminal of all of the memory sectors. Thus, as shown, the first read out terminal 402a of memory sector I is connected in common to the drivers 420 and 426. The second read out terminal 402b of memory sector I is connected in common to the drivers 424 and 428. Similarly, the read out terminal 404a of memory sector II is connected in common to the drivers 420 and 426; and the second read out terminal 404b of the memory sector II is connected in common to the drivers 424 and 428. The remaining read out terminals of memory sectors III, IV and V are similarly connected. Each of the drivers 420, 424, 426 and 428 includes an inhibit input terminal which is adapted to receive an inhibit signal. Such an inhibit signal, such as a binary "1" is capable of preventing the inhibited driver from energizing its corresponding display, thereby effectively "blanking out" that display. As shown, the inhibit terminals of the drivers 420 and 424 are connected in common and the inhibit input terminals of the drivers 426 and 428 are connected in common. The inhibit signal supplied to the drivers 420 and 424 is produced by the OR circuit 416, described above, and the inhibit signal applied to the drivers 426 and 428 is produced by the OR circuit 418. It is recalled that these OR circuits are connected to the OR circuit 144 which, in turn, receives an inhibit signal produced by the OR circuit 142. In addition, the OR circuit 416 includes another input terminal connected to one output of the clock generator 414 and is adapted to receive one of the timing pulses produced by the clock generator during each multiplex cycle. The OR circuit 418 also includes another input terminal which is connected to another, complementary, output of the clock generator 414 and is adapted to receive the other timing pulse during each multiplex cycle. Thus, during each multiplex cycle, the OR circuits 416 and 418 alternately supply inhibit signals to the drivers 420, 424 and to the drivers 426, 428, respectively, regardless of whether an inhibit signal is supplied by the OR circuits 142 and 144. Of course, should such an inhibit signal be supplied by the OR circuits 142 and 144, the inhibit signal which is applied to all of the drivers is maintained throughout the entire multiplex cycle.

It is recalled that various conditions can lead to an inhibit condition, as described in detail hereinabove. One additional condition also will result in inhibiting all of the drivers 420, 424, 426 and 428. This additional condition now will be described. It may be appreciated that some of the addressable storage locations in some memory sectors will not be provided with postal rate data. In general, such locations will not be addressed. However, to account for the possibility of an erroneous address, it is preferred that, should such a location be addressed, the contents thereof are not displayed. Accordingly, such locations are provided with predetermined data words, these data words being read out through the first and second read out terminals in the event of an erroneous address. A gate, such as AND gate 412, is comprised of multiple inputs which are connected to the memory read out terminals of each memory sector, this gate being adapted to detect when the predetermined data word has been read out. For example, if this predetermined data word consists of a binary "1" in each bit location, the AND gate 412 is adapted to detect this word and to produce an inhibit signal in response thereto, such an inhibit signal being supplied through the OR circuit 144 (FIGURE 2C) to the OR circuits 416 and 418 so as to inhibit all of the drivers 420, 424, 426 and 428.

In operation, let it be assumed that parcel post is the selected class of shipment. A representative portion of the postage rate for parcel post is set forth below in Table I.

Table I

| Weight 1 pound and not exceeding (pounds) | Parcel Post | | | | | | | |
|---|---|---|---|---|---|---|---|---|
| | Zones | | | | | | | |
| | Local | 1&2 | 3 | 4 | 5 | 6 | 7 | 8 |
| 2 | $0.61 | $0.72 | $0.75 | $ .83 | $0.92 | $1.02 | $1.12 | $1.21 |
| 3 | .65 | .78 | .83 | .92 | 1.04 | 1.18 | 1.32 | 1.45 |
| 4 | .69 | .84 | .90 | 1.01 | 1.16 | 1.33 | 1.51 | 1.69 |
| 5 | .73 | .90 | .98 | 1.10 | 1.28 | 1.49 | 1.71 | 1.93 |
| 6 | .77 | .96 | 1.05 | 1.19 | 1.40 | 1.64 | 1.90 | 2.17 |

It has been assumed that the postal rates for parcel post, a portion of which having been represented above in Table I, are stored in memory sector I. Accordingly, the memory select circuit 222 will supply an enable signal to the enable input terminal of the memory sector I. Once the parcel has been placed upon the weighing platform and a desired zone selector switch 40 has been actuated, the address generator 136 and the address coder 322 will supply an address for a particular storage location in the memory sector I. It is appreciated that this storage location address is supplied in common to all of the memory sectors; but since only the memory sector I has been enabled, only the storage location in that sector will be addressed. Let it be assumed that the parcel weighs 5 pounds and the zone 5 selector switch 40f has been actuated. Accordingly, the address which is produced by the combination of the address generator 136 and the address coder 322 will select the storage location whereat a postal rate of $1.28 is stored.

Now, during a first portion of the multiplex cycle, the first part of the addressed location is read out of the memory I sector and is supplied to all of the drivers. In particular, the tens digit for the dollars representation (which in this case is 0) is supplied from the read out terminal 402a in common to the drivers 420 and 426. At the same time, the units digit for the dollars representation (in this case 1) is read out of the read out terminal 402b and is supplied in common to the drivers 424 and 428. However, during this portion of the multiplex cycle, the timing pulse supplied by the clock generator to the OR circuit 418 functions as an inhibit signal to thereby inhibit the drivers 426 and 428. Consequently, the display 432 is "blanked out" and the display 430 is energized by the drivers 420 and 424 to thereby display the dollars representation which is stored in the first part of the addressed memory location and which now is being read out of the memory sector I. Hence, the display 430 will indicate 01.

During the next portion of the multiplex cycle, the negative timing pulse is supplied to the memory sector I so that the second part of the addressed location now is read out. It is appreciated that, during this portion of the multiplex cycle, the coded representation of the tens digit for the cents data is read out from the memory read out terminal 402a (in this case the numeral 2) and is supplied in common to the drivers 420 and 426. At the same time, the units digit for the cents data is read out from the memory read out terminal 402b (in this case the numeral 8) and is supplied in common to the drivers 424 and 428. However, during this portion of the multiplex cycle, the clock pulse which is supplied to the OR circuit 416 by the clock pulse generator 414 serves as an inhibit signal to thereby inhibit the drivers 420 and 424 from energizing the display 430. Thus, during this second portion of the multiplex cycle, the display 432 indicates 28 cents.

In view of the foregoing, it is appreciated that the displays 430 and 432 are alternately energized during each multiplex cycle, and the frequency at which these displays are energized preferably is chosen to be sufficiently high such that an observer thereof will not notice any flickering effect. Accordingly, during each multiplex cycle, the data representing the dollars of the postal rate is read out and displayed by the display 430; followed by the data representing the cents of the postal rate which then is read out and is displayed by the display 432. By reason of this multiplexing, or time-sharing, technique, low cost, commercially available memory devices can be used for each memory sector. While the postal rate should be displayed as a four-digit decimal number, thereby requiring sixteen bits of BCD information, nevertheless each memory sector may be comprised of a memory device which is capable of storing only an 8-bit BCD number. By alternately reading out the first and second parts of each addressed location, the full sixteen bits will be read out during each multiplex cycle.

It is, of course, appreciated that the drivers 420, 424, 426 and 428 are inhibited from energizing their associated displays 430 and 432 in the event that any one or more of the aforedescribed inhibit conditions should occur. Thus, even though a selected memory sector might be addressed, the data which is stored at the addressed location will not be displayed. Thus, if a parcel is not placed upon the weighing platform, the counter chain will represent "zero" weight and an inhibit signal will be produced by the NOR circuit 140 and supplied through the OR circuits 142, 144, 416 and 418 to all of the drivers. Similarly, when a parcel is removed from the weighing platform, and the platform subsequently overshoots its reference position, an inhibit signal representing a "negative" weight will be produced by the flip-flop circuit 132 and will be supplied through the OR circuits 144 and the OR circuits 416 and 418 to all of the drivers. Furthermore, if a class selector switch 30 has not been positively actuated, an inhibit signal will be produced by the class storage circuit 206 and will be supplied to the inverter circuit 216 and the OR circuits 142, 144, 416 and 418 to inhibit all of the drivers. Similarly, if a zone selector switch has not been properly actuated, an inhibit signal will be produced by the flip-flop circuit 318 and will be supplied through the OR circuits 142, 144, 416 and 418 to thereby inhibit all of the display drivers. Also, if an improper zone has been selected when, for example, UPS intrastate or blue label classes of shipment have been selected, the zone comparator 324 will produce an inhibit signal which is supplied through the aforenoted OR circuits to thereby inhibit the display driver. Finally, if an improper storage location, such as a non-assigned location, is inadvertently addressed, the contents thereof will be particularly detected by the AND gate 412 so as to produce an inhibit signal which is supplied through the OR circuits 144, 416 and 418 to all of the display drivers. In this fashion, an improper or confusing display of information will not be provided.

It is recognized that the remaining memory sectors are selected and addressed in the same fashion as that just described with respect to the memory sector I. In the event that the memory sector V is selected, for example, if priority mail is selected as the class of shipment and ½ pound information is to be used, or if the parcel weight is greater than 64 pounds, then this additional data is provided as part of the address for the memory sector V. That is, the ½ pound information produced by the ½ pound detector circuit 146 is combined with the address code produced by the address generator 136 and the address coder 322 to select a suitable storage location in the memory sector V whereat the postal rate for priority mail in terms of ½ pound increments is stored. This postal rate information is read out in multiplex form, as described above, and is appropriately displayed by the displays 430 and 432. Similarly, if the parcel weight is greater than 64 pounds, this information is combined with the coded address produced by the address generator 136 and the address coder 322 to select the appropriate storage locations in the memory sector V whereat the postal rates for parcels weighing more than 64 pounds are stored. This rate information stored in the addressed location is read out in multiplex form and displayed by the displays 430 and 432 in the manner discussed in detail hereabove.

While the present invention has been particularly described with respect to a preferred embodiment thereof in the environment of a particular postage scale, it is readily apparent that various changes and modifications in form and details can be made. In addition, this invention finds application in various types of data processing devices and need not be limited solely to the environment of a postage scale.

Also, the particular postage scale which has been described herein is particularly adapted to be changed to incorporate various modifications in form and details. For example, depending upon the particular digital signals which are used and the compatability of the various logic components, the encoders, code converters, address generators and the like can be altered or omitted, as desired. The various class and zone selector switches may comprise any suitable keyboard entry devices which are conventionally used in data processing apparatus. Similarly, the indicating lamps, weight displays and postal rate displays may comprise other conventional indicating devices. A single display panel can be provided, for example, to indicate the particular class of shipment which has been selected, the particular zone which has been selected, the weight of the parcel and the determined postal rate therefor. As another example, the same display which is used to indicate the postal rate also can be used to indicate the parcel weight, if suitable switching devices are provided.

In addition to, or as a substitution for, the postal rate displays, various conventional mechanisms can be provided to automatically record and apply the read out postal rate to the parcel being weighed. Moreover, since the read out postal rate is arranged in a desirable digitized coded form, it is appreciated that such postal rate data can be used by other devices, such as a digital computer, or the like, to aid in automatic accounting procedures wherein a record of such postage is to be stored. Additionally, although the units of weight have here been described with reference to pounds and to ounces, as well as to ½ pound increments, it is appreciated that the weight can be in terms of decimal fractions of pounds. Also, if desired, other weight units can be employed, such as grams, kilograms and the like. In the event that the parcel weight is not measured in terms of ounces, it should be appreciated that the ounce counter 112 can be replaced by a decimal counting circuit capable of counting, for example, tenths of pounds.

In another embodiment of this invention, in addition to producing inhibit signals upon the occurrence of various predetermined conditions so that the displays 430 and 432 are prevented from displaying information, the respective inhibit signals are used to actuate associated inhibit indicators to thereby apprise the operator of the particular condition which has occurred. For example, the "zero" weight inhibit signal, produced by the NOR circuit 140, may be applied to a zero weight indicator; the "negative" weight inhibit signal produced by the flip-flop circuit 132 may be applied to a negative weight indicator; the failure to properly actuate a class selector switch can be indicated by a suitable indicator which is driven by the appropriate stage in the class storage circuit 206. The remaining inhibit condition indications can be similarly provided.

In yet another embodiment, each multiplex cycle is defined by more than only two clock pulses. In such an embodiment, multiplex techniques are used to select various portions of each addressed location in a memory sector, and corresponding display drivers are selectively energized or disabled. For example, instead of storing the tens and units digits for the dollars representation of postal rate as an 8-bit word in a first part of an addressable location, and the tens and units digits for the cents representation of postal rate as an 8-bit word in a second part of that addressable location; the tens digit of the dollars representation can be stored in a first part as a 4-bit word, the units digit of the dollars representation can be stored in a second part as a 4-bit word, the tens digit of the cents representation can be stored in a third part, and the units digit of the cents representation can be stored in a fourth part. Each of these parts then can be read out of a memory sector on a timesharing basis during one multiplex cycle.

The foregoing, as well as various other changes and modifications, can be made without departing from the spirit and scope of the present invention. It is intended that the appended claims be interpreted as including all such changes and modifications.

What is claimed is:

1. A postage scale or the like for displaying the postal rate for a parcel to be shipped to a destination, comprising first selectively operable means for selecting the class of shipment of said parcel; second selectively operable means for selecting the relative destination zone of said parcel; weight data generating means for generating digital data corresponding to the weight of a parcel placed on said scale; memory means having a plurality of sections, each section corresponding substantially to at least one of said classes of shipment and storing, at addressable locations therein, postal rate data for each weight increment of a parcel to be shipped to each of said destination zones by said corresponding class of shipment; addressing means responsive to the selective operation of said first and second selectively operable means and to said parcel weight data for addressing a memory storage location associated with a parcel of determined weight to be shipped to a selected destination zone by a selected class of shipment; memory read-out means for reading out stored postal rate data from said addressed memory storage location; display means coupled to said memory read-out means for displaying an alphanumeric representation of said stored postal rate data; detecting means for detecting a plurality of conditions including the absence of a parcel from said scale, the removal of a parcel from said scale, the improper selection of a destination zone, the incomplete selection of a class of shipment and the addressing of an improper memory storage location; and inhibit means responsive to at least one of said conditions detected by said detecting means for inhibiting the display of an alphanumeric representation.

2. A postage scale in accordance with Claim 1 wherein said first selectively operable means comprises a plurality of individual manually actuated class selecting switches, each associated with a respective class of shipment for producing a corresponding signal upon being actuated; and said detecting means includes means for sensing when none of said class selecting switches is actuated and for producing a signal indicative of an incomplete selection of a class of shipment to said memory read-out means, thereby to inhibit the display of an alphanumeric representation by said display means.

3. A postage scale in accordance with claim 1 wherein said second selectively operable means comprises a plurality of individual manually actuated zone selecting switches, each associated with a respective zone for producing a corresponding signal upon being actuated; and said detecting means includes means for sensing when none of said zone selecting switches is actuated and for producing a signal indicative of an incomplete selection of a zone to said memory read-out means, thereby to inhibit the display of an alphanumeric representation by said display means.

4. A postage scale in accordance with claim 3 wherein said second selectively operable means further comprises zone encoding means coupled to all of said zone selecting switches for producing an encoded representation of the actuated zone selecting switch, said encoded zone representation being usable as a portion of the address of a memory storage location, and for producing an output signal having a change in the state thereof when said encoded zone representation is produced; and said sensing means included in said detecting means comprises means for normally providing said produced signal and for terminating same in response to said change in state of said output signal.

5. A postage scale in accordance with claim 1 wherein each storage location in said memory means that is not provided with postal rate data is provided with a predetermined stored signal; and said detecting means includes means for detecting when said predetermined stored signal is read out from said memory means and for producing a signal indicative of an improper memory storage location address to said memory read-out means, thereby to inhibit the display of an alphanumeric representation by said display means.

6. A postage scale or the like for displaying the postal rate for a parcel to be shipped to a destination, comprising first selectively operable means for selecting the class of shipment of said parcel; second selectively operable means for selecting the relative destination zone of said parcel; weight data generating means for generating digital data corresponding to the weight of a parcel placed on said scale said weight data generating means comprises pulse generating means for generating a number of pulses proportional to the weight of said parcel; and multistage pulse counting means coupled to said pulse generating means for counting said generated pulses; memory means having a plurality of sections, each section corresponding substantially to at least one of said classes of shipment and storing, at addressable locations therein, postal rate data for each weight increment of a parcel to be shipped to each of said destination zones by said corresponding class of shipment; addressing means responsive to the selective operation of said first and second selectively operable means and to said parcel weight data for addressing a memory storage location associated with a parcel of determined weight to be shipped to a selected destination zone by a selected class of shipment; memory read-out means for reading out stored postal rate data from said addressed memory storage location; display means coupled to said memory read-out means for displaying an alphanumeric respresentation of said stored postal rate data; and inhibit means for inhibiting the display of an alphanumeric representation in response to at least one of a plurality of conditions including the absence of a parcel from said scale, the removal of a parcel from said scale, the improper selection of a destination zone, the incomplete selection of a class of shipment and the addressing of an improper memory storage location, said inhibit means includes detecting means coupled to said multistage pulse counting means and responsive to the contents of at least selected stages of said multi-stage pulse counting means for detecting if said stages are empty and for supplying an inhibit signal indicative of zero weight to said memory read-out means, thereby to inhibit the display of an alphanumeric representation by said display means.

7. A postage scale in accordance with claim 6 wherein said multi-stage pulse counting means comprises an up/down pulse counter having an overflow terminal for producing an overflow signal when said up/down counter is decremented below a reference count by the pulses generated by said pulse generating means when said parcel is removed from said scale; and said inhibit means further includes overflow detecting means for detecting said overflow signal and for supplying an inhibit signal indicative of the removal of said parcel to said memory read-out means, thereby to inhibit the display of an alphanumeric representation by said display means.

8. A postage scale or the like for displaying the postal rate for a parcel to be shipped to a destination, comprising first selectively operable means for selecting the class of shipment of said parcel and including a plurality of individual manually actuated class selecting switches, each associated with a respective class of shipment for producing a corresponding signal upon being actuated, said first selectively operable means further comprises class encoding means coupled to all of said class selecting switches for producing an encoded representation of the actuated class selecting switch and for producing an output signal having a change in the state thereof when said encoded representation is produced; second selectively operable means for selecting the relative destination zone of said parcel; weight data generating means for generating digital data corresponding to the weight of a parcel placed on said scale; memory means having a plurality of sections, each section corresponding substantially to at least one of said classes of shipment and storing, at addressable locations therein, postal rate data for each weight increment of a parcel to be shipped to each of said destination zones by said corresponding class of shipment; addressing means for addressing a memory storage location associated with a parcel of determined weight to be shipped to a selected destination zone by a selected class of shipment, said addressing means being supplied with said encoded representation produced by said class encoding means as at least a portion of a memory section address and also being responsive to the selective operation of said second selectively operable means and to said parcel weight data; memory read-out means for reading out stored postal rate data from said addressed memory storage location; display means coupled to said memory read-out means for displaying an alphanumeric representation of said stored postal rate data; and inhibit means for inhibiting the display of an alphanumeric representation in response to at least one of a plurality of conditions including the absence of a parcel from said scale, the removal of a parcel from said scale, the improper selection of a destination zone, the incomplete selection of a class of shipment and the addressing of an improper memory storage location, said inhibit means includes means for sensing when none of said class selecting switches is actuated and for supplying an inhibit signal indicative of an incomplete selection of a class of shipment to said memory read-out means, thereby to inhibit the display of an alphanumeric representation by said display means, said sensing means comprises means for normally providing said inhibit signal and for terminating same in response to said change in state of said output signal.

9. A postage scale or the like for displaying the postal rate for a parcel to be shipped to a destination, comprising first selectively operable means for selecting the class of shipment of said parcel; second selectively operable means for selecting the relative destination zone of said parcel and including a plurality of individual manually actuated zone selecting switches, each associated with a respective zone for producing a corresponding signal upon being actuated; weight data generating means for generating digital data corresponding to the weight of a parcel placed on said scale; memory means having a plurality of sections, each section corresponding substantially to at least one of said classes of shipment and storing, at addressable locations therein, postal rate data for each weight increment of a parcel to be shipped to each of said destination zones by said corresponding class of shipment; addressing means responsive to the selective operation of said first and second selectively operable means and to said parcel weight data for addressing a memory storage location associated with a parcel of determined weight to be shipped to a selected destination zone by a selected class of shipment; memory read-out means for reading out stored postal rate data from said addressed memory storage location; display means coupled to said memory read-out means for displaying an alphanumeric representation of said stored postal rate data; and inhibit means for inhibiting the display of alphanumeric representation in response to at least one of a plurality of conditions including the absence of a parcel from said scale, the removal of a parcel from said scale, the improper selection of a destination zone, the incomplete selection of a class of shipment and the addressing of an improper memory storage location, said inhibit means includes means for sensing when none of said zone selecting switches is actuated and for supplying an inhibit signal indicative of an incomplete selection of a zone to said memory read-out means, thereby to inhibit the display of an alphanumeric representation by said display means, and said inhibit means further comprises comparator means for receiving a signal representing said actuated zone selecting switch and for receiving a signal representing the selected class of shipment of said parcel to produce a comparator output signal if said selected class of shipment does not provide for the destination zone as represented by said actuated zone selecting switch, said comparator output signal being supplied as an inhibit signal indicative of an improperly selected zone to said memory read-out means, thereby to inhibit the display of an alphanumeric representation by said display means.

10. In apparatus for producing an output digital manifestation of an input analog quantity, the combination comprising an encoding element bearing indicia, said encoding element being displaced by an amount determined by said analog quantity; indicia sensing means adjacent said encoding element for sensing the movement of said indicia past a reference point to produce a number of pulses corresponding to the amount of sensed indicia; up/down counting means for receiving said pulses, said up/down counting means including a decimal counter whose count is incremented when said encoding element is displaced in a first direction and whose count is decremented when said encoding element is displaced in a second direction; converting means coupled to said up/down counting means for converting the count therein into a coded form; output means coupled to said converting means for producing a manifestation of said coded form; and inhibit means responsive to predetermined counts in said up/down counting means for inhibiting said output means from producing said manifestation.

11. The combination of claim 10 wherein said converting means comprises means for producing a parallel multi-bit digital code corresponding to said count; and said inhibit means comprises gate means coupled to said multi-bit digital code producing means for detecting when all of said bits are of a predetermined type to thereby produce an inhibit signal.

12. The combination of claim 11 wherein said decimal counter has a predetermined stage which is actuated when said input analog quantity corresponds to a negative value; and said inhibit means further comprises bistate means which normally exhibits a first state and which exhibits a second state only when said decimal counter predetermined stage has been actuated, said second state being adapted to produce said inhibit signal.

13. Apparatus for providing a coded representation of the actuation of a selected one of a plurality of switches, comprising a plurality of signal lines equal in number to said switches; means for applying a signal to one of said signal lines in correspondence with the actuation of an associated switch; encoding means coupled to all of said signal lines and energizable by a received signal for producing a plural bit encoded signal determined by the particular signal line to which said signal is applied; temporary store means coupled to said encoding means and actuable to receive and store said encoded signal only when said encoding means is energized; code producing means coupled to said temporary store means for producing a coded representation in response to said stored encoded signal and for applying said coded representation to output means; and inhibit means disposed to normally inhibit said output means and for enabling said output means only when said temporary store means is actuated.

14. Apparatus for providing a coded representation of the actuation of a selected one of a plurality of switches, comprising a plurality of signal lines equal in number to said switches; means for applying a signal to one of said signal lines in correspondence with the actuation of an associated switch; encoding means coupled to all of said signal lines and energizable by a received signal for producing a plural bit encoded signal determined by the particular signal line to which said signal is applied, said encoding means including gate means having plural data bit output terminals whereat said plural bit encoded signal is produced in parallel, and at least one control output terminal for producing a control signal when said encoding means is energized; temporary store means coupled to said encoding means and actuable to receive and store said encoded signal only when said encoding means is energized, said temporary store means including a number of storage stages at least equal to the number of data bit output terminals for individually storing the bits of said plural bit encoded signal, and an enable input terminal for receiving said control signal to enable said storage stages to store said plural bit encoded signal; code producing means coupled to said temporary store means for producing a coded representation in response to said stored encoded signal and for applying said coded representation to output means; and inhibit means disposed to normally inhibit said output means and for enabling said output means only when said temporary store means is actuated.

15. The apparatus of claim 14 wherein said gate means further includes a pulse output terminal for producing a pulse whenever one of said switches is actuated; said temporary store means further includes a trigger input terminal for receiving a trigger pulse, said storage stages being enabled to store said plural bit encoded signal only when said control signal and said trigger pulse coincide; and further comprising one-shot pulse producing means for producing a trigger pulse of predetermined duration in response to said pulse produced by said gate means pulse output terminal.

16. The apparatus of claim 15 wherein said gate means has $n$ data bit output terminals; said temporary store means includes $n+1$ storage stages; and the number of switches is equal to $2^n+1$; and wherein one of said storage stages is connected to one of said signal lines, said one signal line not being connected to said gate means; and further comprising an OR circuit having a first input connected to said one signal line, a second input connected to said gate means control output terminal, and an output connected to said enable input terminal of said storage stages.

17. The apparatus of claim 16 wherein said inhibit means comprises bistate means normally disposed in a first state to inhibit said output means; and means for changing the state of said bistate means to a second state in response to a signal on said one signal line or in response to said control signal produced at said gate means control output terminal.

18. A method for determining and displaying the postal rate for shipping a parcel to a destination zone by a selected class of shipment wherein the postal rate for each predetermined weight increment is stored at addressable locations in a memory, said locations being in memory sections associated with a class of shipment and being addressed as a function of the weight of said parcel and the destination zone of said parcel, comprising the steps of:
  producing a digital count as a function of the weight of said parcel;
  selecting a class of shipment for said parcel and producing a digitally encoded class representation thereof;
  selecting a destination zone for said parcel and producing a digitally encoded zone representation thereof;
  selecting a memory section as a function of said encoded class representation;
  addressing a location of said selected memory section in accordance with said digital count in combination with said encoded zone representation;
  reading out the postal rate data stored at said addressed location in time sharing format;
  applying said read out data to display means in time sharing format to thereby display the appropriate postal rate for a parcel of said weight to be shipped by said selected class to said selected zone;
  detecting the following conditions:
    a. said digital count represents zero weight;
    b. said digital count represents an effective negative weight;
    c. a class of shipment has not been selected;
    d. a destination zone has not been selected;
    e. the destination zone which has been selected is not compatible with the class of shipment which has been selected; and
    f. no postal rate data is stored at the addressed location of said memory; and
  inhibiting the application of data to said display means in response to at least one of said detected conditions.

19. The method of claim 18 wherein said step of producing a digital count comprises: generating a first set of successive pulses when a parcel is placed on a weighing scale and a second set of successive pulses when said parcel is removed from said weighing scale; incrementing a counter from an initial reference count in response to said first set of pulses; decrementing said counter in response to said second set of pulses; and generating an output signal when said counter is decremented below said reference count; and wherein said step of detecting includes the step of detecting said output as an indication that said digital count represents an effective negative weight.

* * * * *